US012228712B2

(12) United States Patent
Umehara

(10) Patent No.: US 12,228,712 B2
(45) Date of Patent: Feb. 18, 2025

(54) ZOOM LENS AND APPARATUS HAVING THE SAME

(71) Applicant: CANON KABUSHIKI KAISHA, Tokyo (JP)

(72) Inventor: Satoshi Umehara, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 52 days.

(21) Appl. No.: 17/537,222

(22) Filed: Nov. 29, 2021

(65) Prior Publication Data

US 2022/0171172 A1    Jun. 2, 2022

(30) Foreign Application Priority Data

Dec. 2, 2020    (JP) ................................ 2020-200477

(51) Int. Cl.
  *G02B 15/14*    (2006.01)
  *G02B 13/18*    (2006.01)
  *G02B 15/16*    (2006.01)

(52) U.S. Cl.
  CPC ......... *G02B 15/1421* (2019.08); *G02B 13/18* (2013.01); *G02B 15/143* (2019.08); *G02B 15/145* (2019.08); *G02B 15/16* (2013.01)

(58) Field of Classification Search
  CPC .. G02B 15/1421; G02B 13/18; G02B 15/143; G02B 15/145; G02B 15/16; G02B 15/1465; G02B 15/145521; G02B 15/143507; G02B 15/145515; G02B 15/145531; G02B 15/20; G02B 15/14
  USPC ..... 359/691, 695, 698, 708, 725, 729, 7, 54, 359/781
  See application file for complete search history.

(56) References Cited

U.S. PATENT DOCUMENTS 11,630,289 B2 *    4/2023    Tang ............. G02B 15/143507
                                                                    359/689
2007/0223105 A1    9/2007    Sensui
2010/0277811 A1    11/2010    Kim
(Continued)

FOREIGN PATENT DOCUMENTS

CN    102096179 A    6/2011
CN    111751965 A    10/2020
(Continued)

OTHER PUBLICATIONS

English translation of JP-6834146-B2 (Feb. 2021).*
English translation of JP-2014178388 (2014).*

*Primary Examiner* — Thomas K Pham
*Assistant Examiner* — Kuei-Jen L Edenfield
(74) *Attorney, Agent, or Firm* — CANON U.S.A., INC. IP DIVISION

(57) ABSTRACT

A zoom lens includes in order from an object side, a negative first lens unit and a rear lens unit including one or more lens units, an interval between adjacent lens units being changed during zooming, in which the first lens unit and the one or more lens units can be set to first, second and third zoom states, in which angles of view at first and second image heights at the first zoom state are respectively 160° or larger, in which a distortion at the first image height at the third zoom state is −30% or more, and the first image height, the second image height, a total length of the zoom lens at a wide angle end, and a focal length at the wide angle end are appropriately set.

28 Claims, 18 Drawing Sheets

(56) References Cited

U.S. PATENT DOCUMENTS

| | | |
|---|---|---|
| 2011/0228158 A1 | 9/2011 | Imaoka |
| 2013/0235467 A1* | 9/2013 | Heu ................. G02B 13/00 |
| | | 359/708 |
| 2017/0068079 A1* | 3/2017 | Kawamura ........ G02B 15/1425 |
| 2018/0196223 A1* | 7/2018 | Umeda .......... G02B 15/145527 |
| 2020/0110251 A1* | 4/2020 | Gyoda .............. G02B 15/1435 |
| 2021/0132346 A1* | 5/2021 | Kitada ................. H04N 23/55 |
| 2022/0291488 A1* | 9/2022 | Yamamoto ........ G02B 15/1425 |

FOREIGN PATENT DOCUMENTS

| | | | |
|---|---|---|---|
| JP | 2007094371 A | | 4/2007 |
| JP | 2009103790 A | | 5/2009 |
| JP | 2009271165 A | | 11/2009 |
| JP | 2012022109 A | | 2/2012 |
| JP | 2012123412 A | | 6/2012 |
| JP | 2014178388 A | * | 9/2014 |
| JP | 2017003646 A | | 1/2017 |
| JP | 2017068114 A | | 4/2017 |
| JP | 2017156507 A | | 9/2017 |
| JP | 6834146 B2 | * | 2/2021 |

* cited by examiner

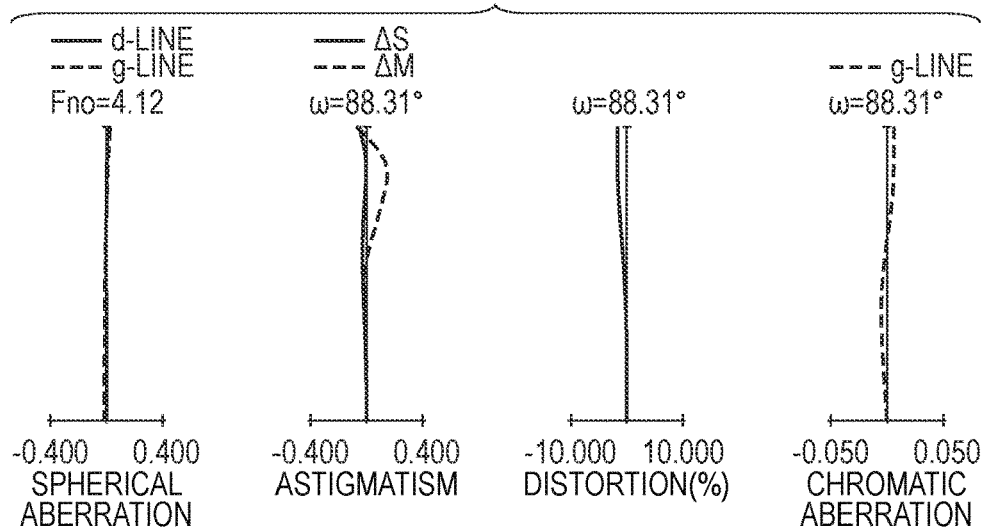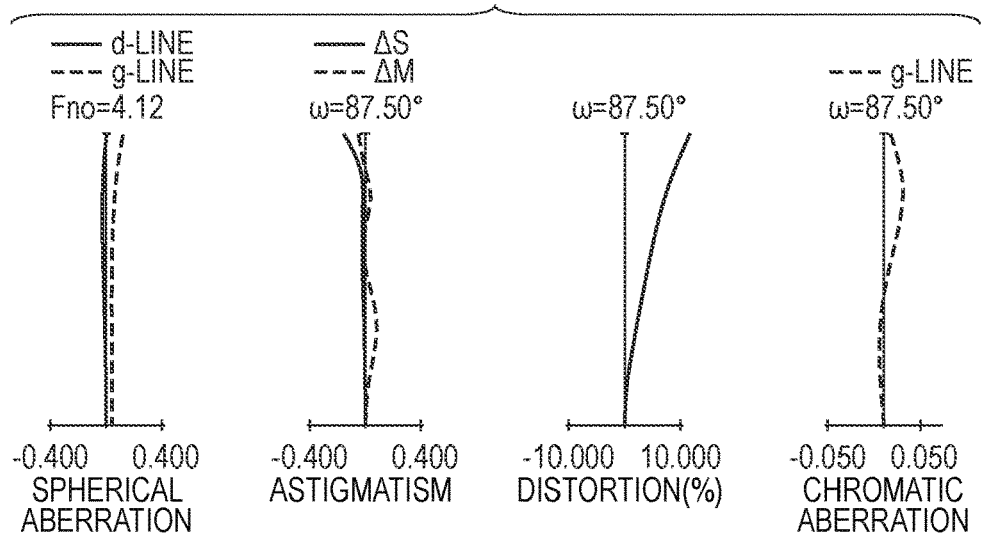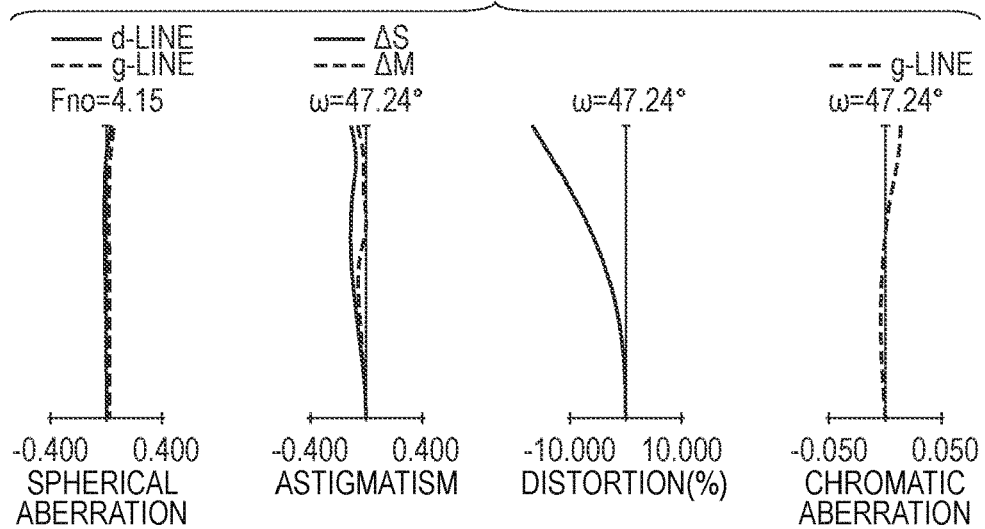

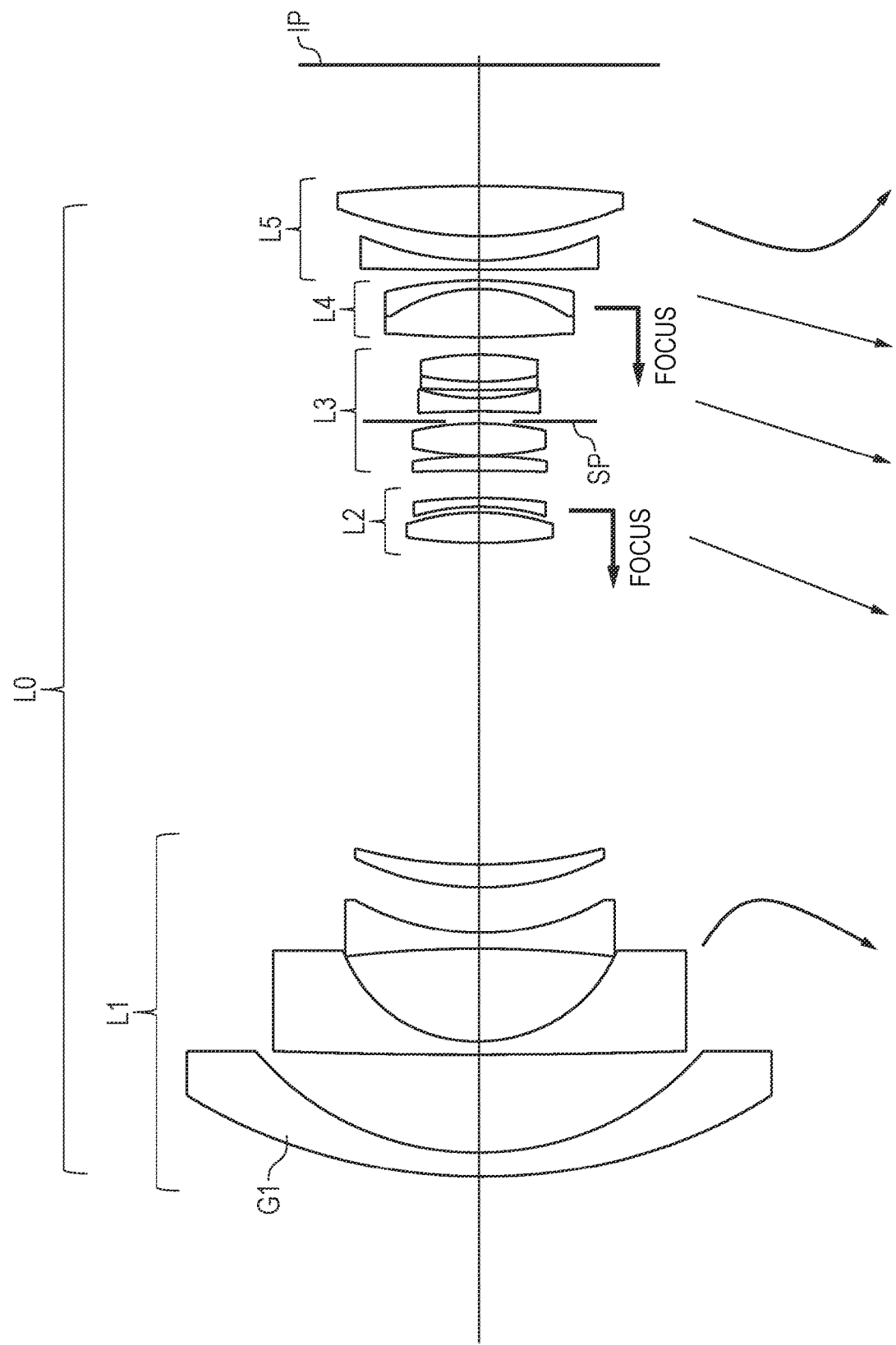

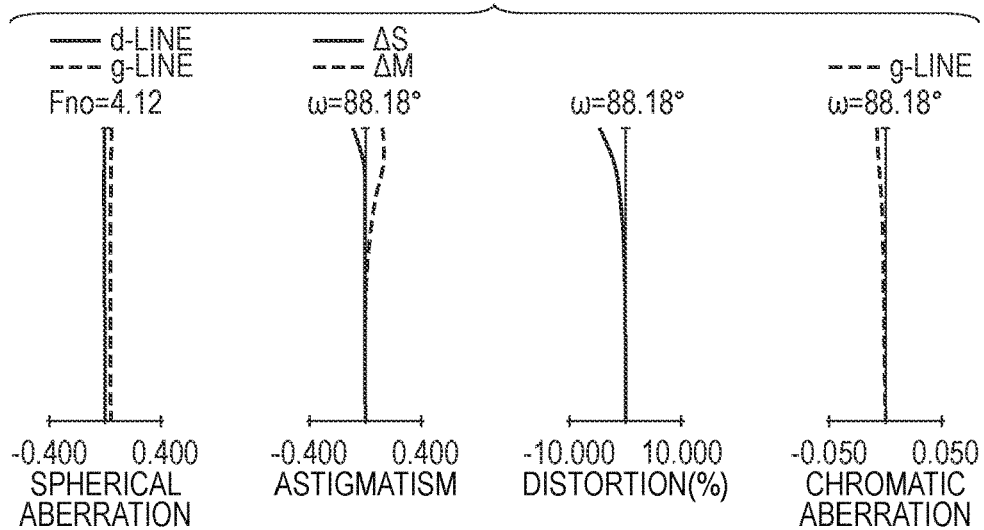
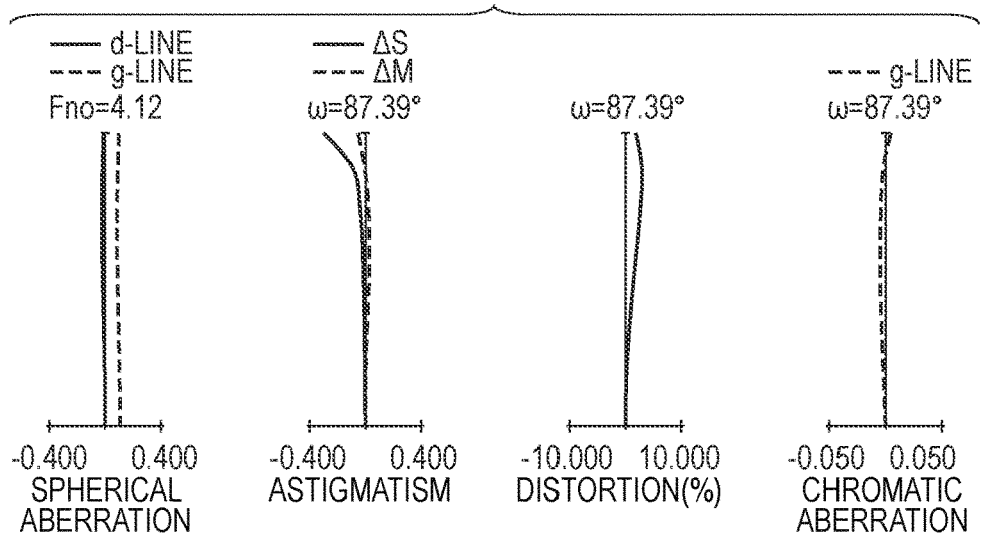
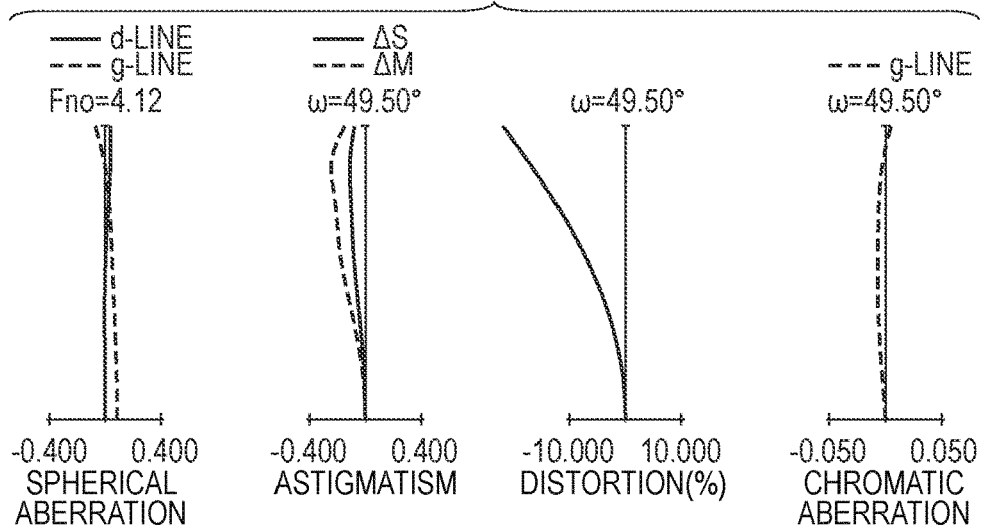

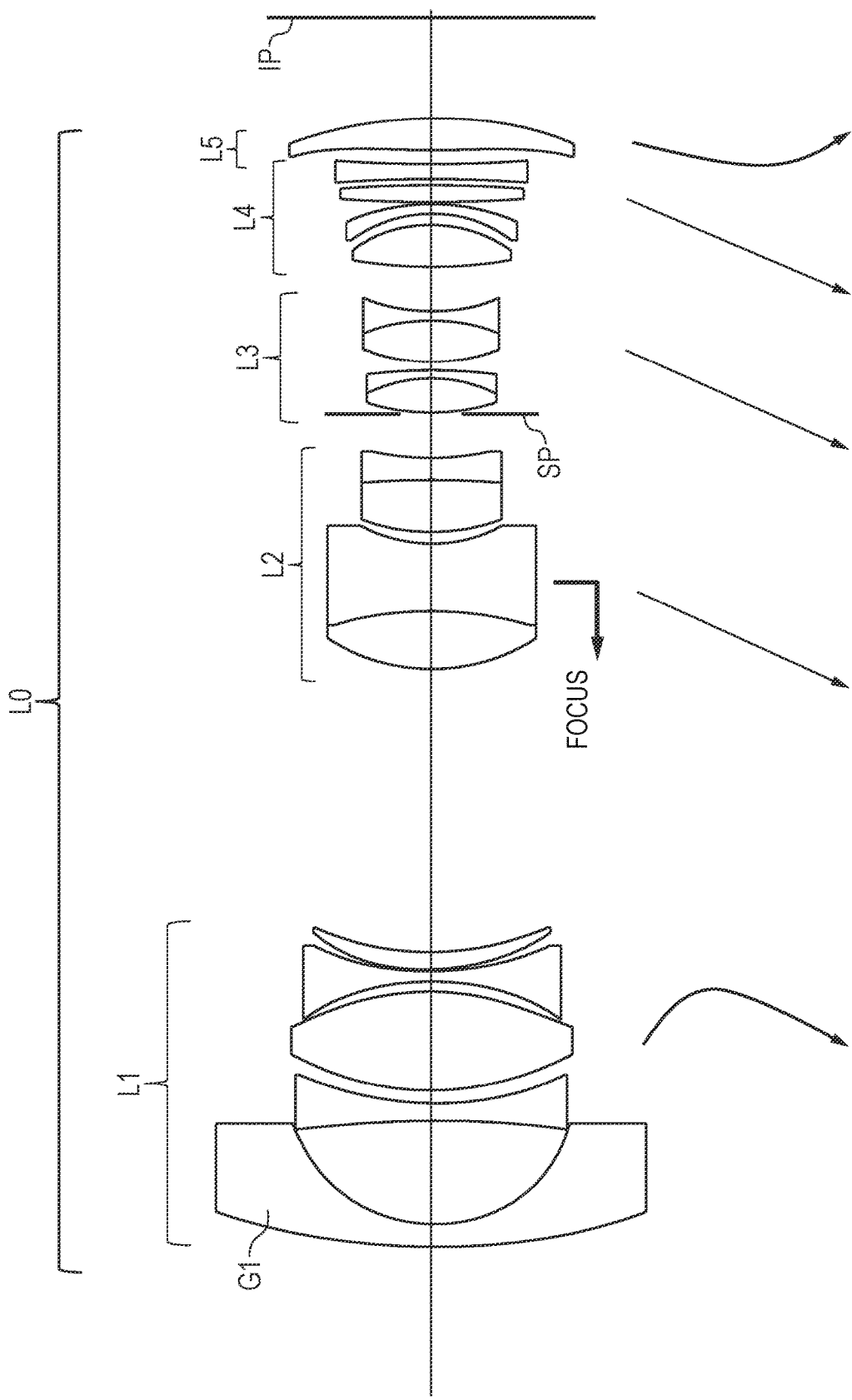

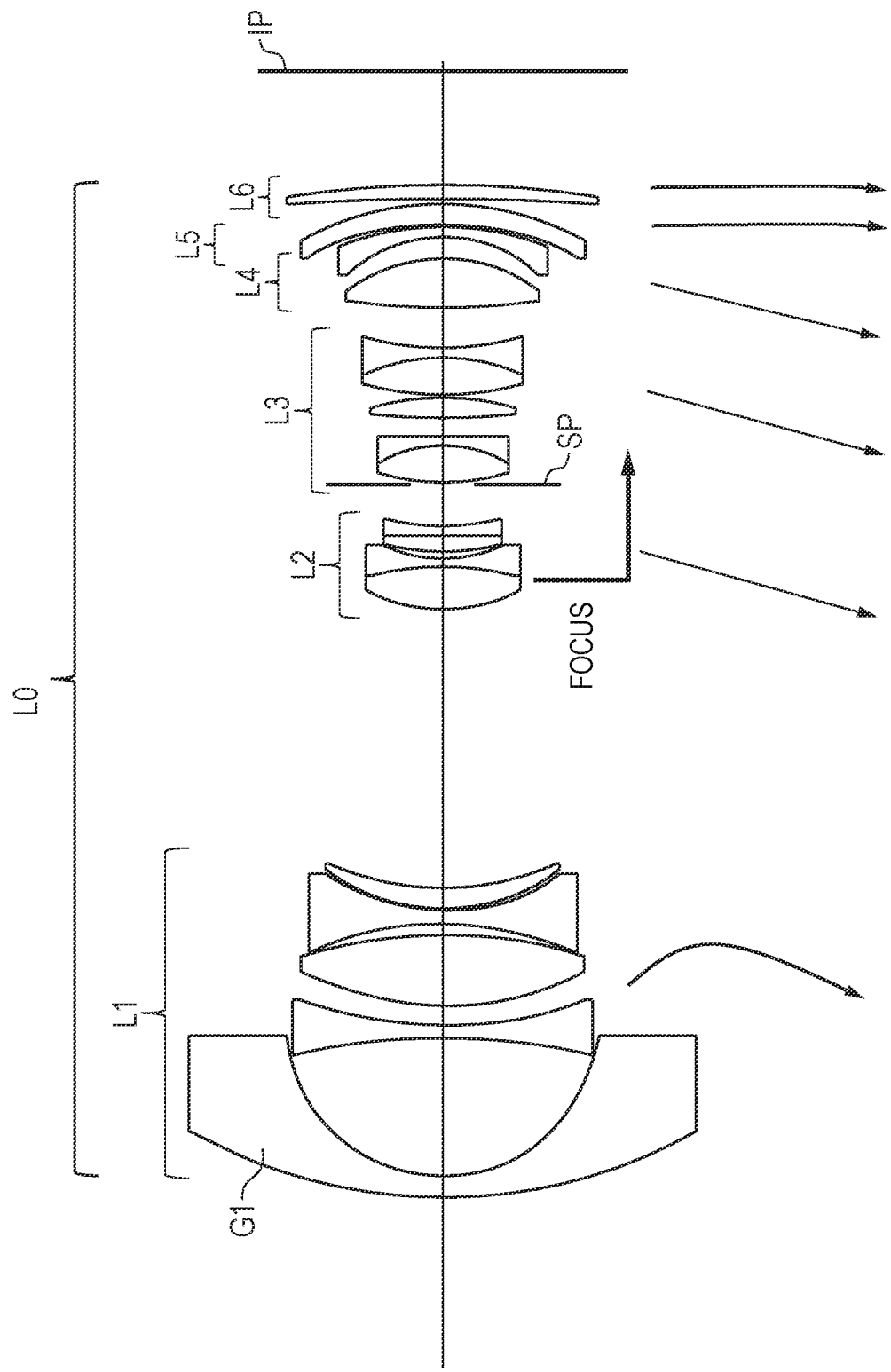

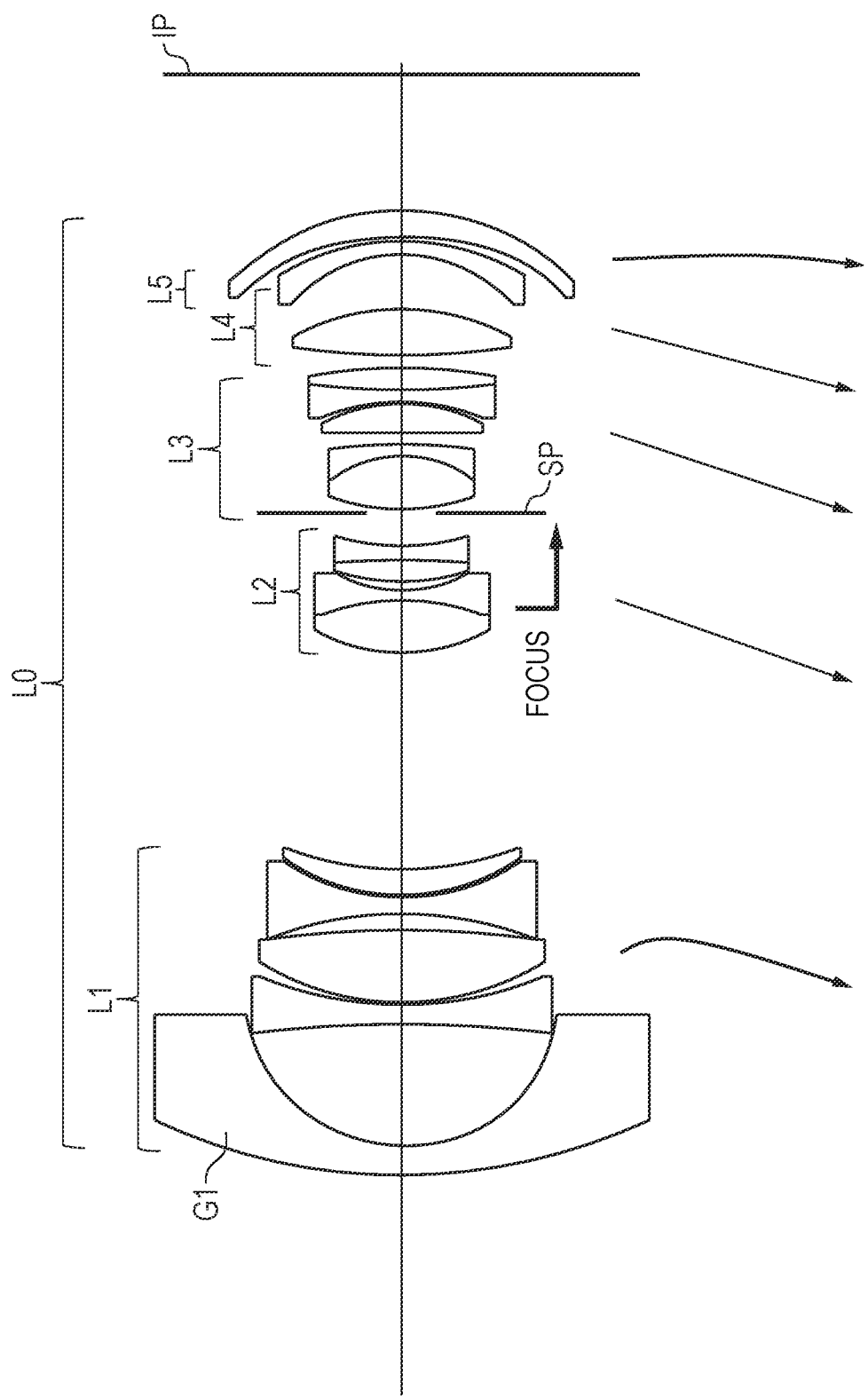

ZOOM LENS AND APPARATUS HAVING THE SAME

BACKGROUND OF THE DISCLOSURE

Field of the Disclosure

The aspect of embodiments relates to a zoom lens and an apparatus having the zoom lens.

Description of the Related Art

Among optical systems, fisheye lenses are known as ones that have a wide angle of view in particular. Fisheye lenses secure a wide angle of view by deliberately generating distortion.

Conventionally, a fisheye zoom lens of a circular fisheye type in the shortest focal length and of a full-frame fisheye type in the longest focal length is known (Japanese Patent Application Laid-Open No. 2017-156507) as a fisheye lens. Also, a zoom lens of a circular fisheye type in the shortest focal length and of a normal type in which a standard angle of view is secured in the longest focal length, is known (Japanese Patent Application Laid-Open No. 2012-123412). In addition, a zoom lens is known, which has an angle of view of approximately 180° from the shortest focal length to an intermediate focal length, secures a standard angle of view in the longest focal length and has a relatively high zoom ratio (Japanese Patent Application Laid-Open No. 2017-003646).

In recent years, an optical system used for an image pickup apparatus is to have a good optical performance and a small total lens length.

In addition, in an in-vehicle camera and a monitoring camera, there is a demand for a lens with a wide angle of view, in which an image pickup with small dead angle is easily performed, and especially, a fisheye lens which can be used in the wide angle of view is attracting attention. There is also a need for a wide angle lenses in which distortion is well corrected.

In Japanese Patent Application Laid-Open No. 2017-156507, a circular fisheye type and a full-frame fisheye type can be used for image pickup, however there is an issue that an image having a small distortion cannot be obtained.

In Japanese Patent Application Laid-Open No. 2012-123412, although an image pickup with from full-frame fisheye to wide angle of the standard angle of view is possible, there is an issue that an image pickup with circular fisheye type cannot be performed.

According to Japanese Patent Application Laid-Open No. 2017-003646, an image pickup with a standard angle of view at the longest focal length can be performed a large zoom ratio, which leads to an enlargement of the entire lens system.

SUMMARY OF THE DISCLOSURE

A zoom lens includes in order from an object side to an image side, a first lens unit having a negative refractive power and a rear lens unit including one or more lens units, an interval between adjacent lens units being changed during zooming, in which the first lens unit and the one or more lens units are set to a first zoom state, a second zoom state, and a third zoom state, in which an angle of view at a first image height at the first zoom state is 160° or larger and an angle of view at a second image height at the second zoom state is 160° or larger, in which a distortion at the first image height at the third zoom state is −30% or more, and in which the following inequalities are satisfied, $$1.5 < H1/H2 < 3.0, \text{ and}$$
$$5.0 < Lw/fw < 22.5$$

where H1 represents the first image height, H2 represents the second image height, Lw represents a distance from a lens surface closest to an object to an image plane at a wide angle end, and fw represents a focal length at the wide angle end.

Further features of the disclosure will become apparent from the following description of exemplary embodiments with reference to the attached drawings.

BRIEF DESCRIPTION OF THE DRAWINGS

FIG. 2A is an aberration diagrams of Embodiment 1 at the shortest focal length.

FIG. 2B is an aberration diagrams of Embodiment 1 at an intermediate focal length.

FIG. 2C is an aberration diagrams of Embodiment 1 at the longest focal length.

FIG. 3 is a crass sectional view of Embodiment 2 at the shortest focal length with focusing on an object at infinity.

FIG. 4A is an aberration diagrams of Embodiment 2 at the shortest focal length.

FIG. 4B is an aberration diagrams of Embodiment 2 at an intermediate focal length.

FIG. 4C is an aberration diagrams of Embodiment 2 at the longest focal length.

FIG. 5 is a crass sectional view of Embodiment 3 at the shortest focal length with focusing on an object at infinity.

FIG. 7 is a crass sectional view of Embodiment 4 at the shortest focal length with focusing on an object at infinity.

FIG. 13 is a crass sectional view of Embodiment 7 at the shortest focal length with focusing on an object at infinity.

DESCRIPTION OF THE EMBODIMENTS

Hereinafter, embodiments of a zoom lens of the present disclosure and an image pickup apparatus having the zoom lens will be described with reference to the accompanying drawings.

The zoom lens of each embodiment is an optical system used in an image pickup apparatus such as a digital video camera, a digital still camera, a broadcasting camera, a silver-halide film camera, a monitoring camera, and the like.

Figure 1:
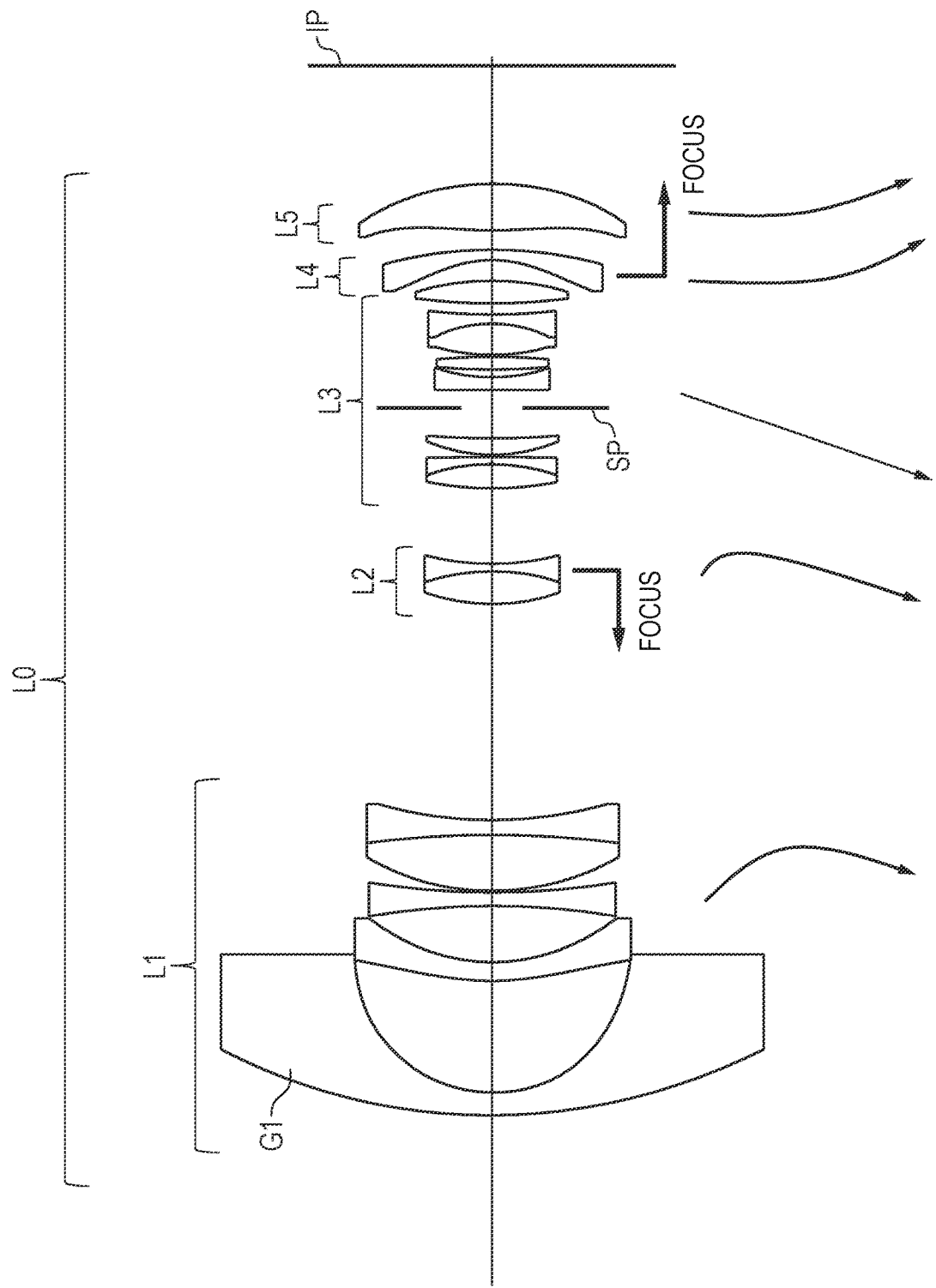
FIG. 1 is a crass sectional view of Embodiment 1 at the shortest focal length with focusing on an object at infinity.

FIG. 1 is a lens cross sectional view of Embodiment 1 of the present disclosure at the shortest focal length with focusing on an object at infinity. FIGS. 2A, 2B and 2C show aberration diagrams of a zoom lens of Embodiment 1 at the shortest focal length (wide angle end), the intermediate focal length and the longest focal length (telephoto end), respectively. Embodiment 1 is a zoom lens with a zoom ratio of 2.9 and an F-number of 4.

FIG. 3 is a lens cross sectional view of Embodiment 2 of the present disclosure at the shortest focal length with focusing on an object at infinity of the present disclosure. FIGS. 4A, 4B, and 4C show aberration diagrams of a zoom lens of Embodiment 2 at the shortest focal length, the intermediate focal length, and the longest focal length, respectively. Embodiment 2 is a zoom lens with a zoom ratio of 2.9 and an F-number of 4.

Figure 6A:
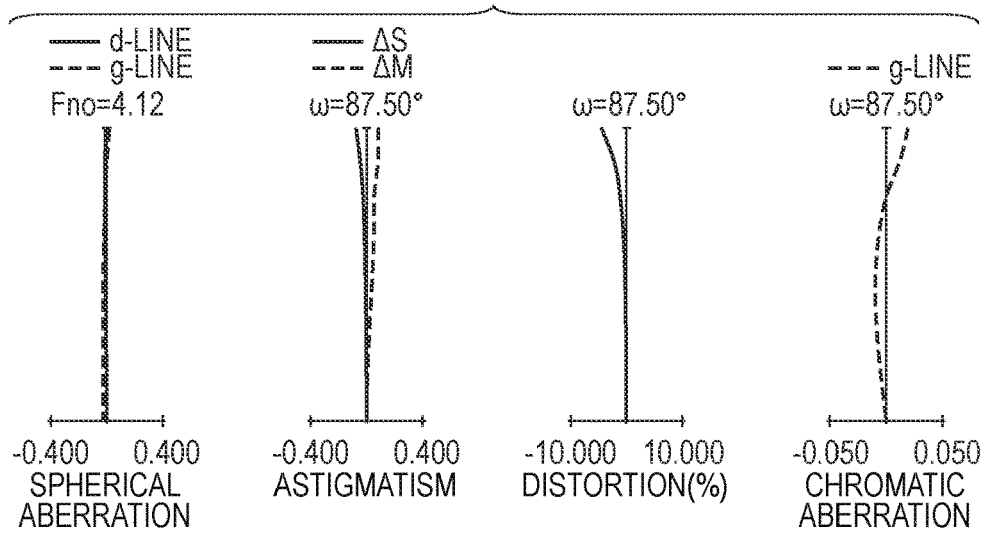
FIG. 6A is an aberration diagrams of Embodiment 3 at the shortest focal length.
Figure 6B:
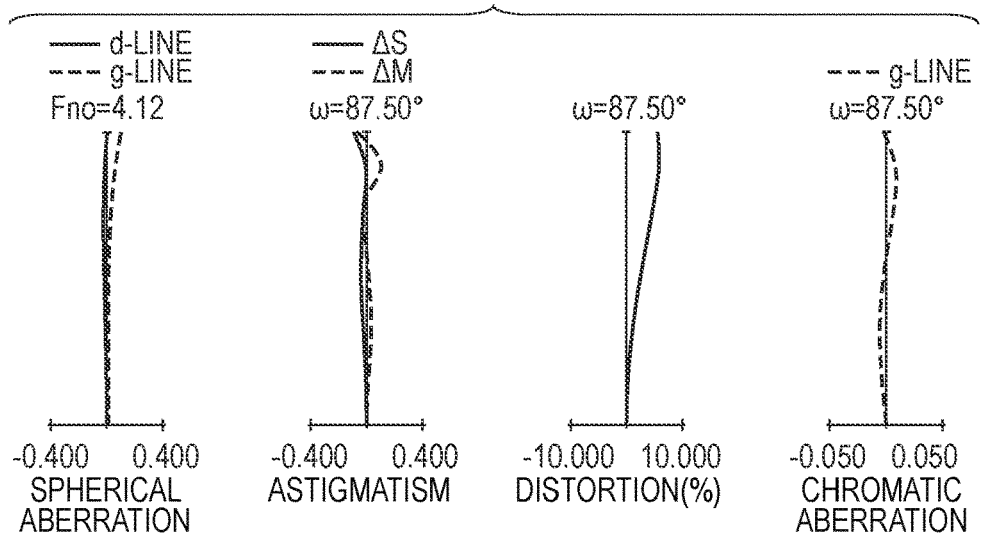
FIG. 6B is an aberration diagrams of Embodiment 3 at an intermediate focal length.
Figure 6C:
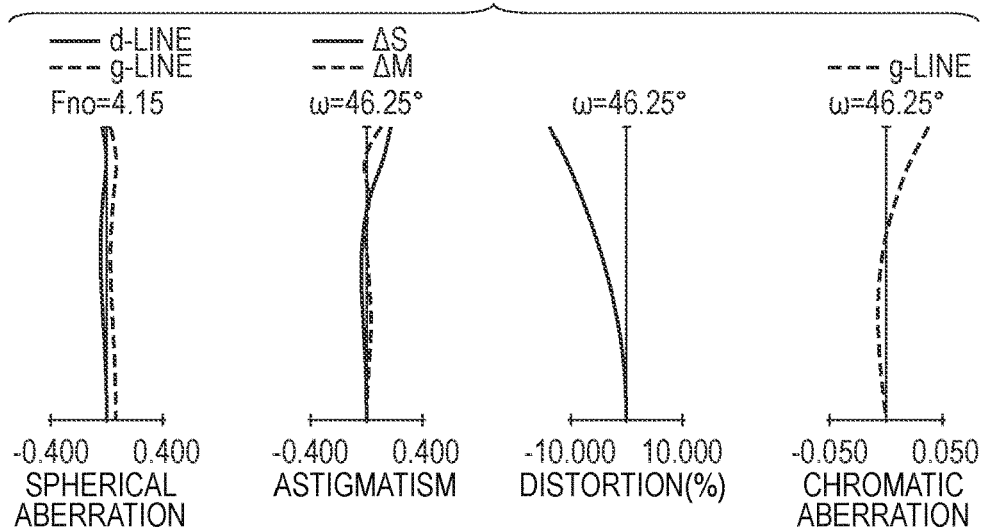
FIG. 6C is an aberration diagrams of Embodiment 3 at the longest focal length.

FIG. 5 is a lens cross sectional view of Embodiment 3 of the present disclosure at the shortest focal length with focusing on an object at infinity. FIGS. 6A, 6B and 6C show aberration diagrams of a zoom lens of Embodiment 3 at the shortest focal length, the intermediate focal length, and the longest focal length, respectively. Embodiment 3 is a zoom lens with a zoom ratio of 2.8 and an F-number of 4.

Figure 8A:
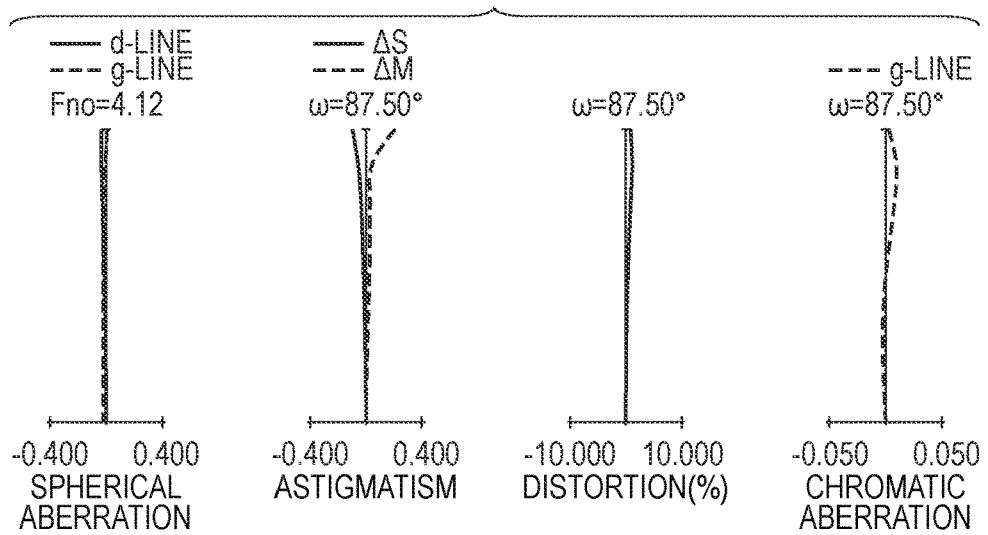
FIG. 8A is an aberration diagrams of Embodiment 4 at the shortest focal length.
Figure 8B:
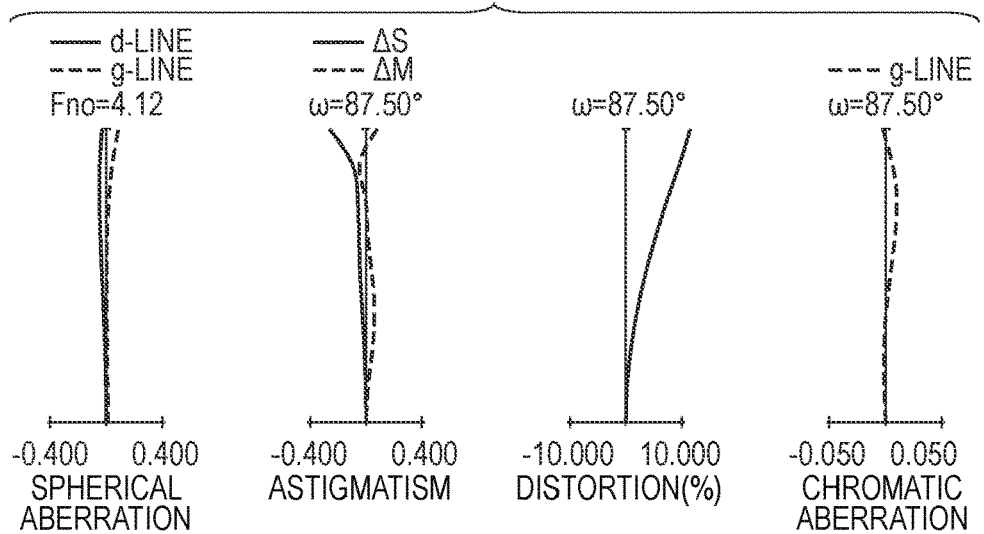
FIG. 8B is an aberration diagrams of Embodiment 4 at an intermediate focal length.
Figure 8C:
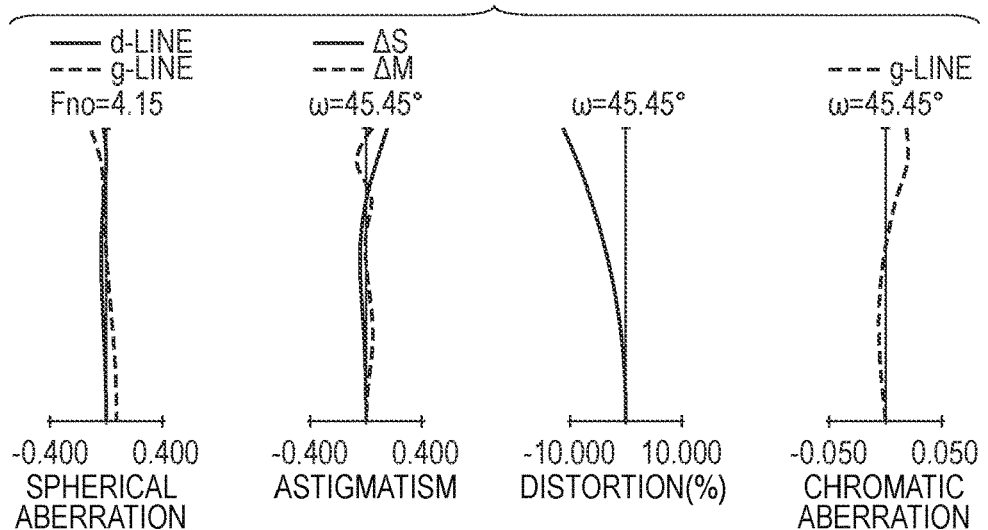
FIG. 8C is an aberration diagrams of Embodiment 4 at the longest focal length.

FIG. 7 is a lens cross sectional view of Embodiment 4 of the present disclosure at the shortest focal length with focusing on an object at infinity. FIGS. 8A, 8B, and 8C show aberration diagrams of a zoom lens of Embodiment 4 at the shortest focal length, the intermediate focal length, and the longest focal length, respectively. Embodiment 4 is a zoom lens with a zoom ratio of 3.0 and an F-number of 4.

Figure 9:
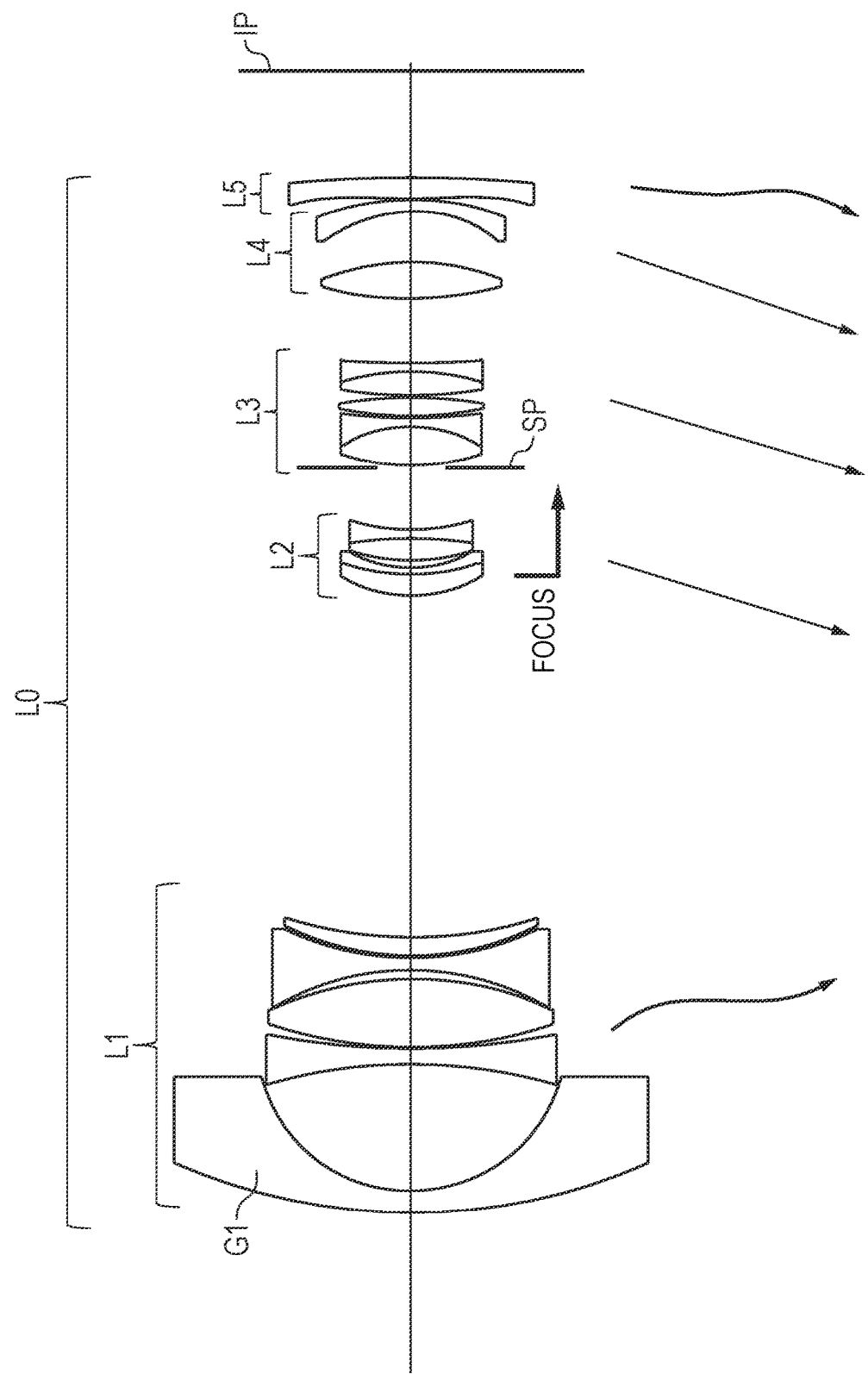
FIG. 9 is a crass sectional view of Embodiment 5 at the shortest focal length with focusing on an object at infinity.
Figure 10A:
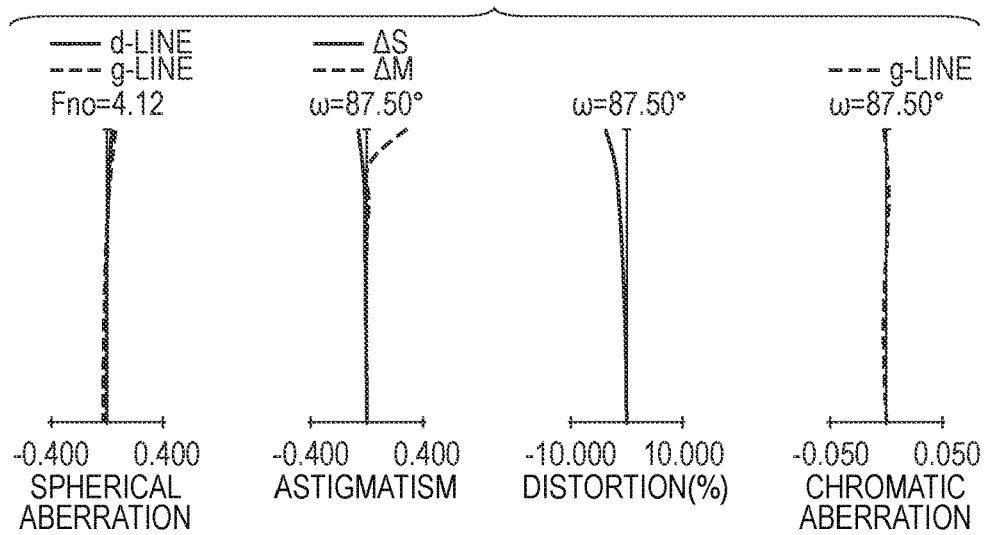
FIG. 10A is an aberration diagrams of Embodiment 5 at the shortest focal length.
Figure 10B:
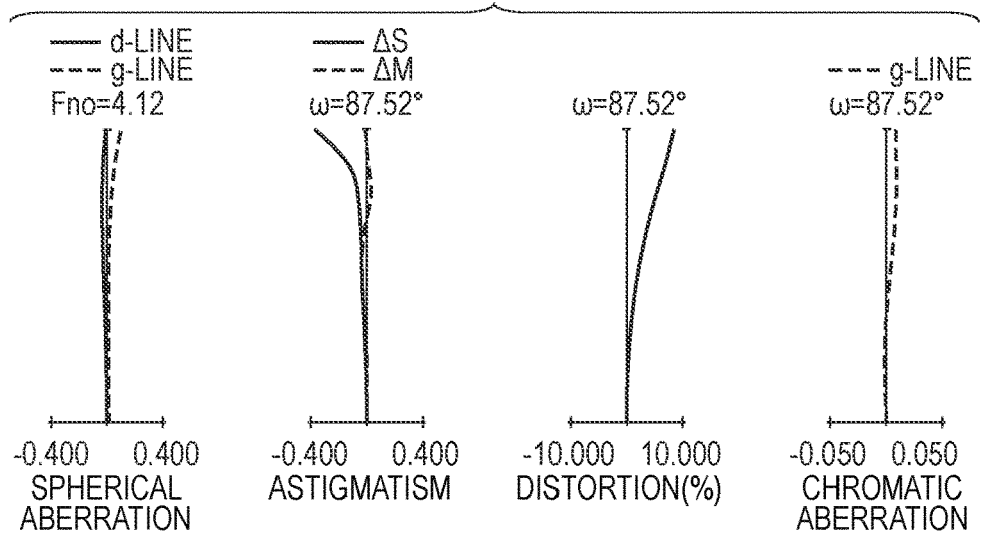
FIG. 10B is an aberration diagrams of Embodiment 5 at an intermediate focal length.
Figure 10C:
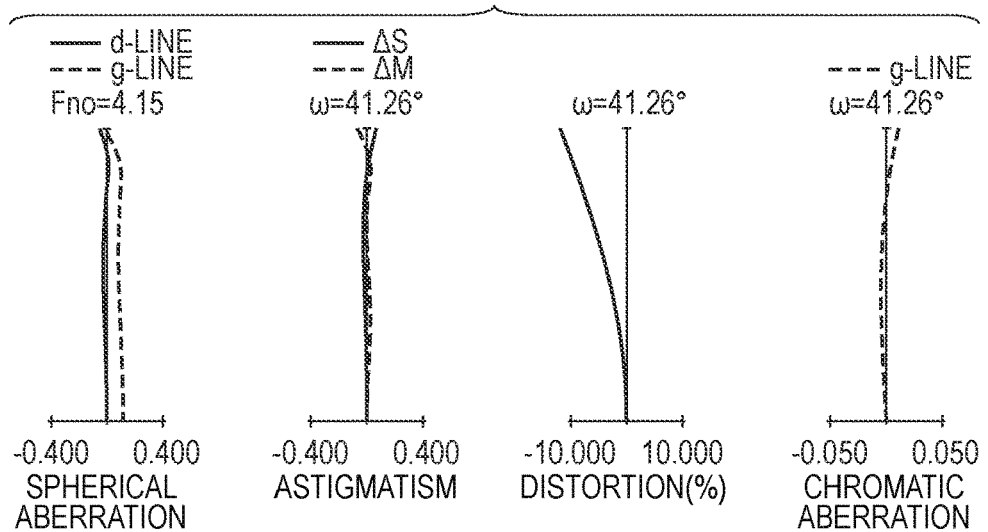
FIG. 10C is an aberration diagrams of Embodiment 5 at the longest focal length.

FIG. 9 is a lens cross sectional view of Embodiment 5 of the present disclosure at the shortest focal length with focusing on an object at infinity. FIGS. 10A, 10B and 10C show aberration diagrams of a zoom lens of Embodiment 5 at the shortest focal length, the intermediate focal length and the longest focal length, respectively. Embodiment 5 is a zoom lens with a zoom ratio of 3.3 and an F-number of 4.

Figure 11:
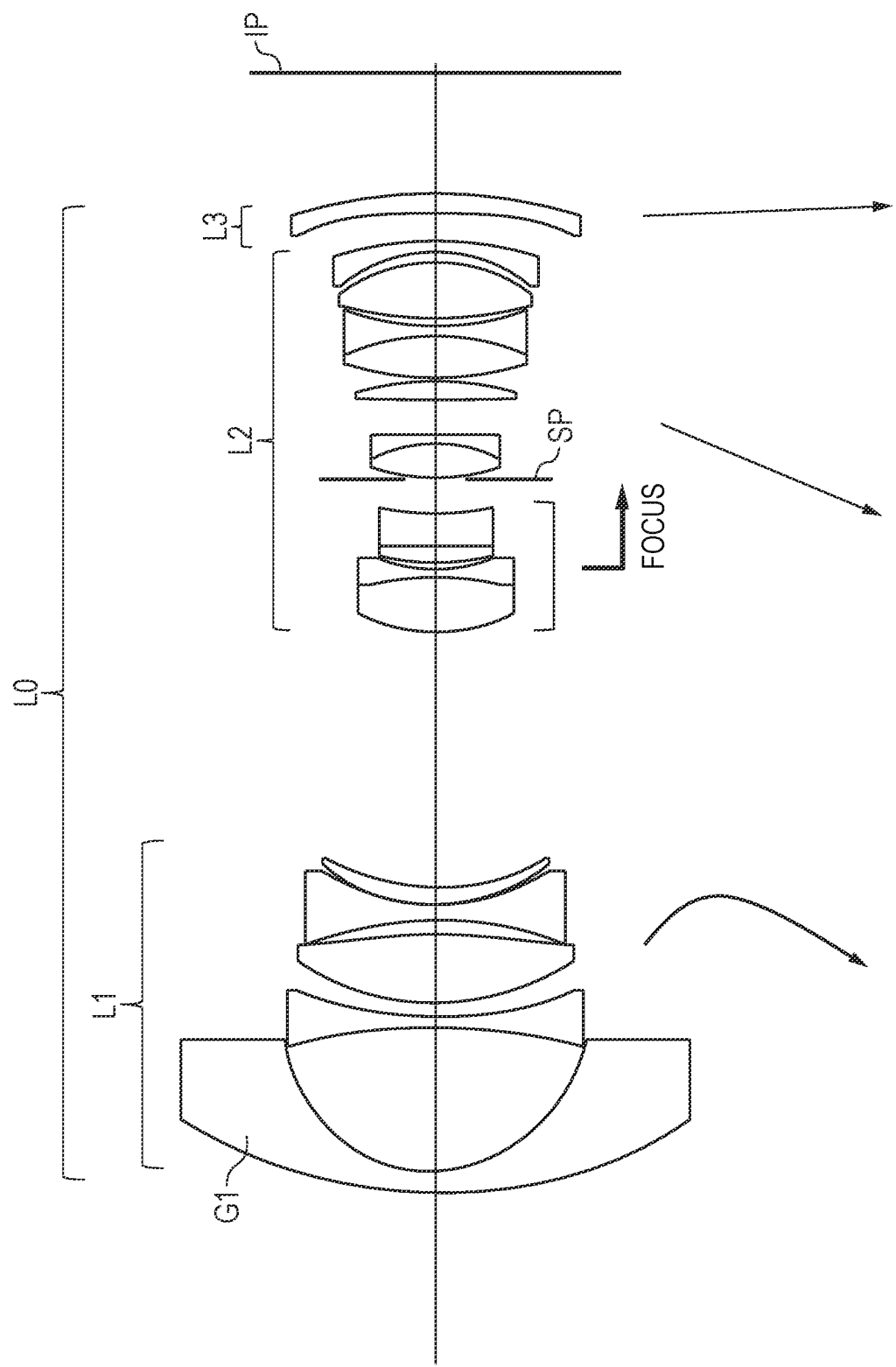
FIG. 11 is a crass sectional view of Embodiment 6 with focusing on an object at infinity.
Figure 12A:
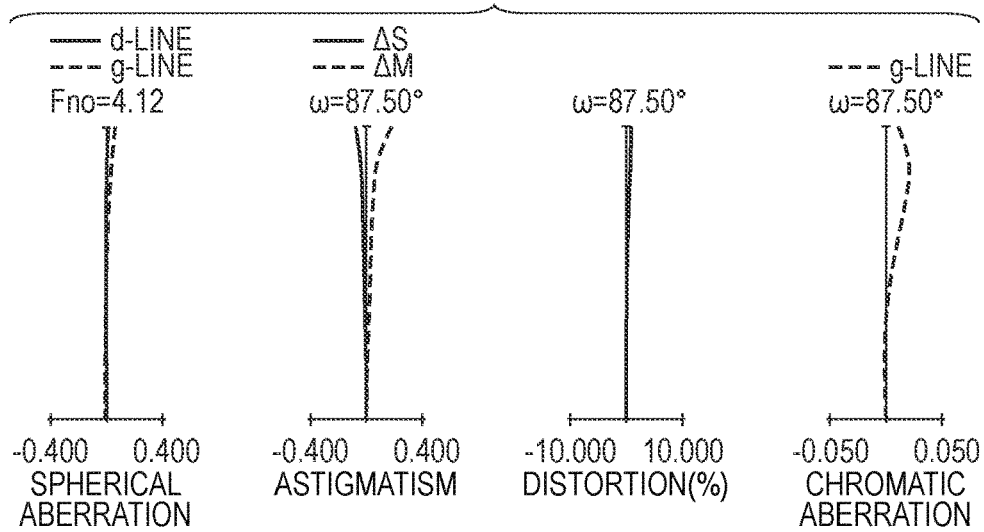
FIG. 12A is an aberration diagrams of Embodiment 6 at the shortest focal length.
Figure 12B:
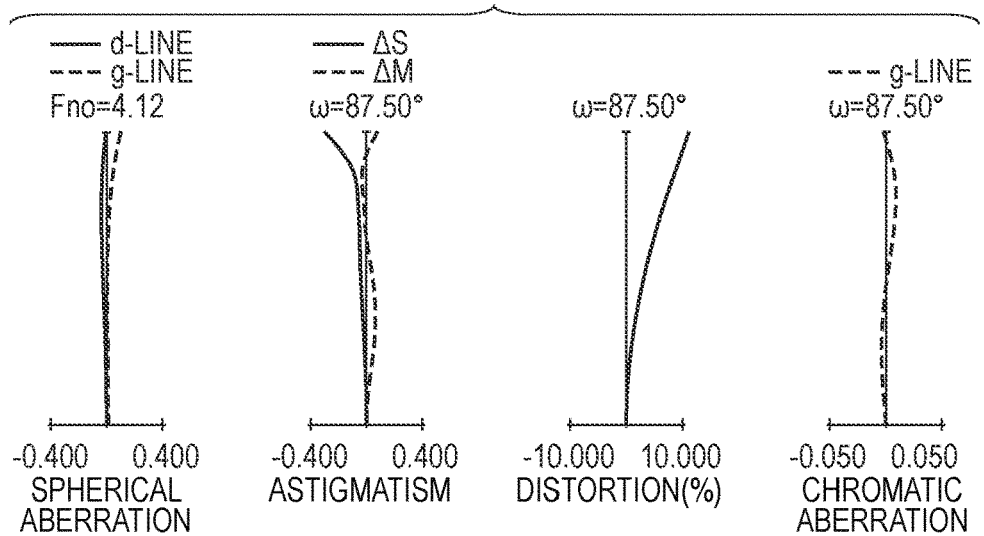
FIG. 12B is an aberration diagrams of Embodiment 6 at an intermediate focal length.
Figure 12C:
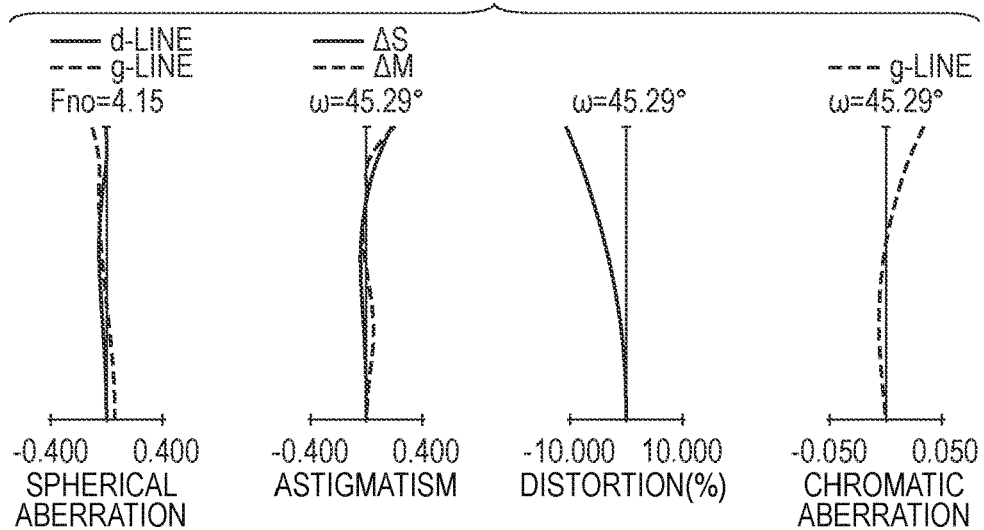
FIG. 12C is an aberration diagrams of Embodiment 6 at the longest focal length.

FIG. 11 is a lens cross sectional view of Embodiment 6 of the present disclosure at the shortest focal length with focusing on an object at infinity. FIGS. 12A, 12B and 12C show aberration diagrams of a zoom lens of Embodiment 6 at the shortest focal length, the intermediate focal length and the longest focal length, respectively. Embodiment 6 is a zoom lens with a zoom ratio of 3.0 and an F-number of 4.

Figure 14A:
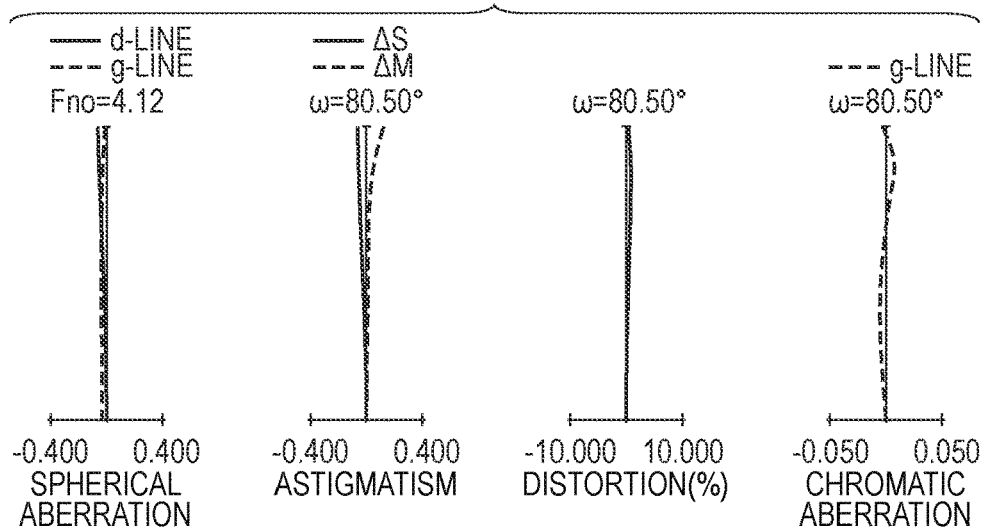
FIG. 14A is an aberration diagrams of Embodiment 7 at the shortest focal length.
Figure 14B:
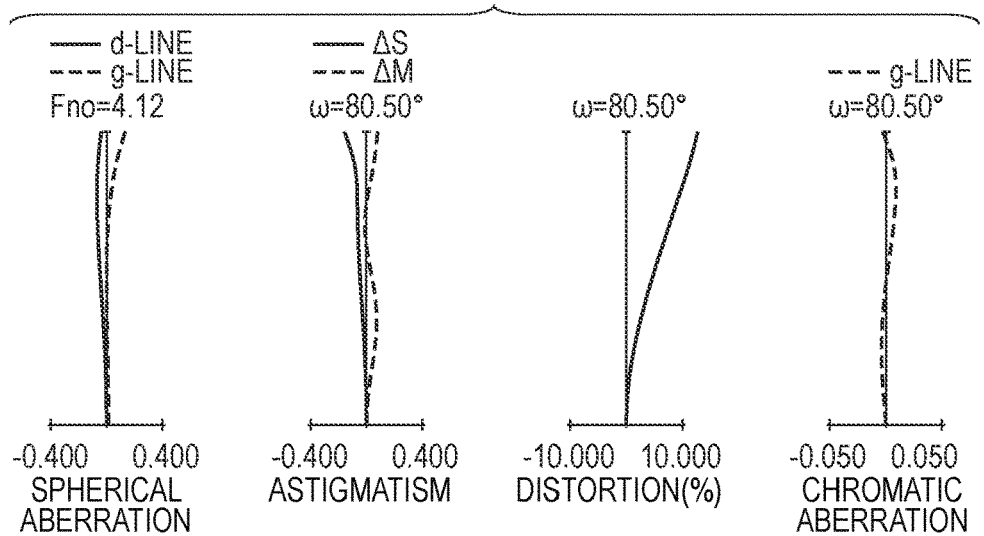
FIG. 14B is an aberration diagrams of Embodiment 7 at an intermediate focal length.
Figure 14C:
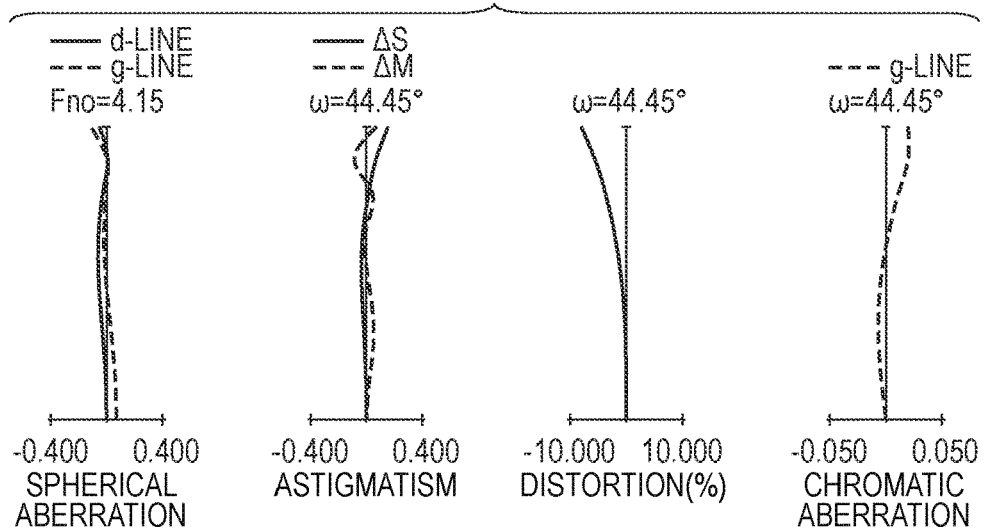
FIG. 14C is an aberration diagrams of Embodiment 7 at the longest focal length.

FIG. 13 is a lens cross sectional view of Embodiment 7 of the present disclosure at the shortest focal length with focusing on an object at infinity. FIGS. 14A, 14B, and 14C show aberration diagrams of a zoom lens of Embodiment 7 at the shortest focal length, the intermediate focal length, and the longest focal length, respectively. Embodiment 7 is a zoom lens with a zoom ratio of 2.8 and an F-number of 4.

Figure 15:
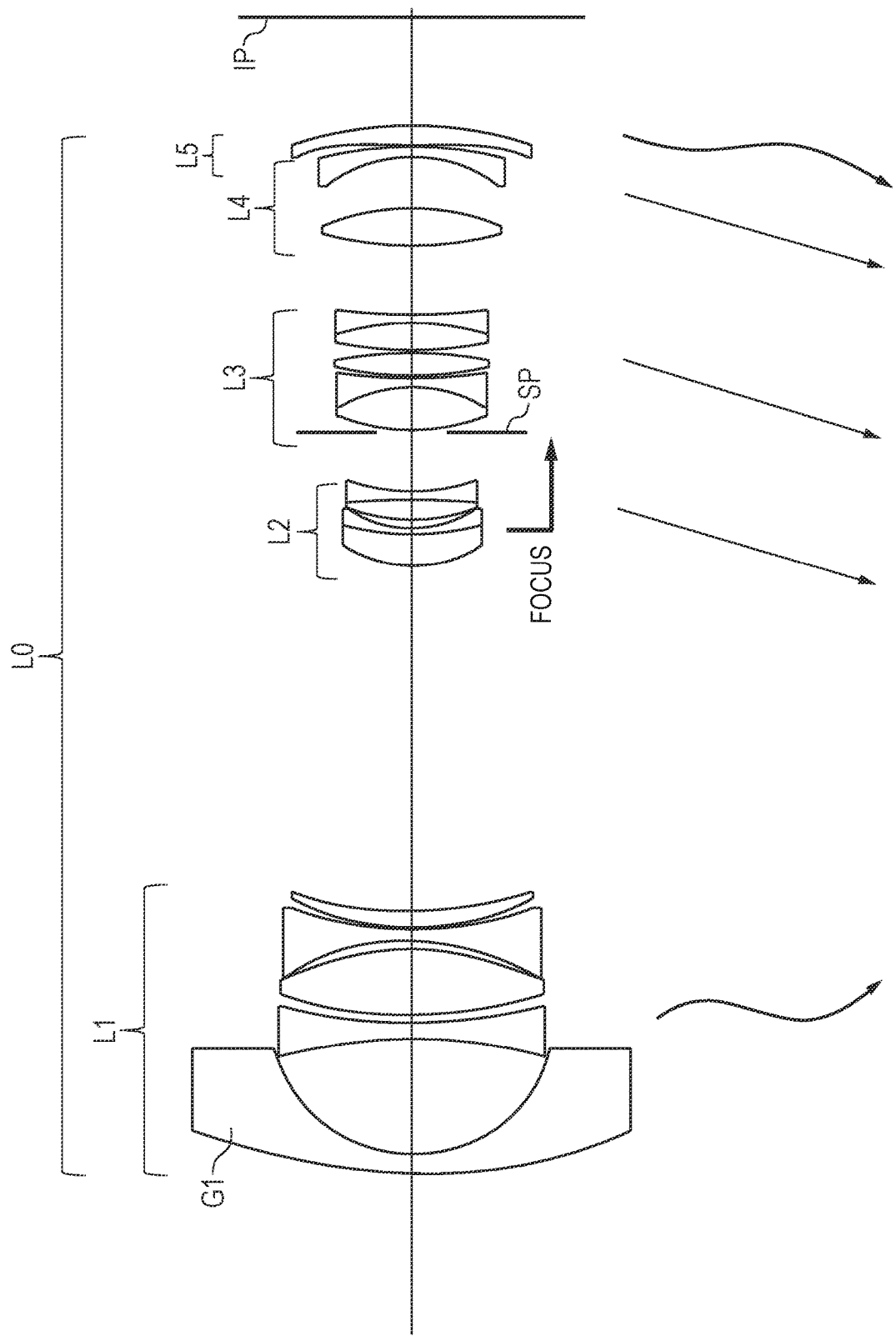
FIG. 15 is a crass sectional view of Embodiment 8 at the shortest focal length with focusing on an object at infinity.
Figure 16A:
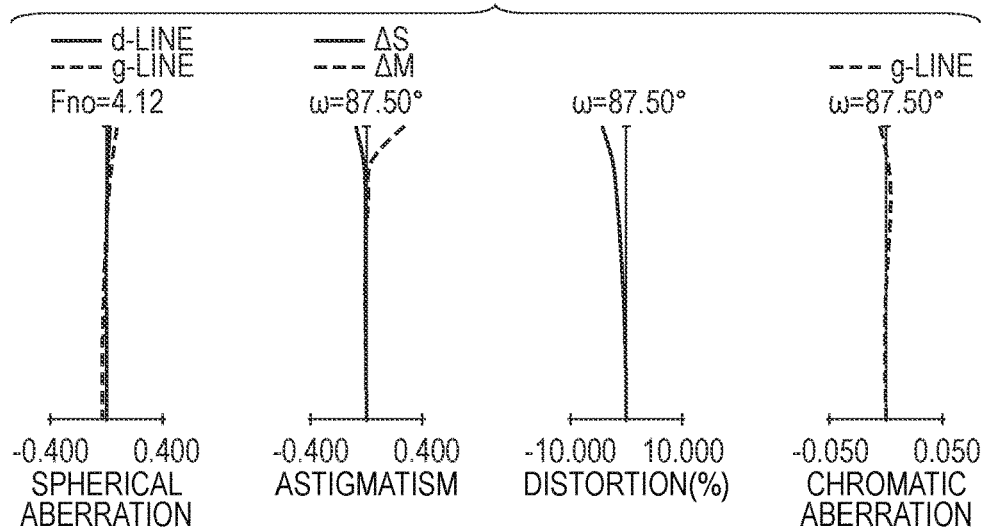
FIG. 16A is an aberration diagrams of Embodiment 8 at the shortest focal length.
Figure 16B:
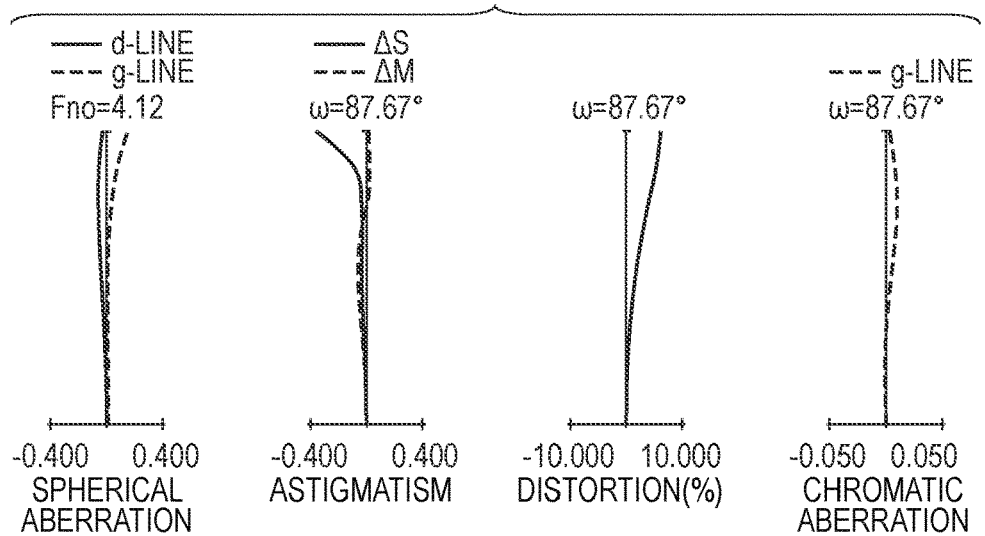
FIG. 16B is an aberration diagrams of Embodiment 8 at an intermediate focal length.
Figure 16C:
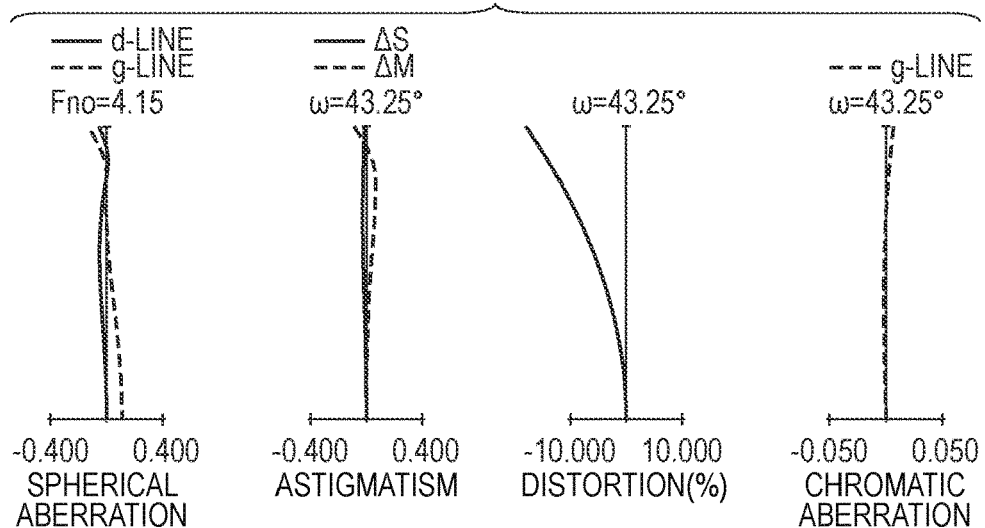
FIG. 16C is an aberration diagrams of Embodiment 8 at the longest focal length.

FIG. 15 is a lens cross sectional view of Embodiment 8 of the present disclosure at the shortest focal length with focusing on an object at infinity. FIGS. 16A, 16B, and 16C show aberration diagrams of a zoom lens of Embodiment 8 at the shortest focal length, the intermediate focal length, and the longest focal length, respectively. Embodiment 8 is a zoom lens with a zoom ratio of 3.3 and an F-number of 4.

In each lens cross section diagram, the left side corresponds to the object side and the right side corresponds to the image side. The zoom lens of each embodiment includes a plurality of lens units. The lens unit is defined as a group of lenses that moves or rest integrally when zooming (changing magnification), focusing. That is, in a zoom lens of each embodiment, an interval between lens units adjacent to each other changes upon zooming from the shortest focal length to the longest focal length. The lens unit may be composed of one lens or a plurality of lenses. The lens unit may include an aperture stop.

If "I" represents the order counted from the object side (i is natural number), reference sign Li indicates the i-th lens unit. The zoom lens L0 of each embodiment comprises a plurality of lens units Li.

The SP represents an aperture stop. The IP represents an image plane, at which an image pickup surface of a solid-state image-pickup element (photoelectric conversion device) such as a CCD sensor or a CMOS sensor is arranged when the zoom lens of each Embodiment is used as an image pickup optical system of a digital still camera or a digital video camera. When the zoom lens of each embodiment is used as image pickup optical system of a silver-halide film camera, photosensitive surface corresponding to the film surface is placed at the image plane IP.

In addition, the zoom lens L0 of each embodiment is configured to move the second lens unit for focusing. In addition, the zoom lens L0 of Embodiments 1 and 2 is configured to move one lens unit Lfl disposed in the image side of the third lens unit. In the following description, in the zoom lens L0 of Embodiments 1 and 2, a lens unit disposed closest to an object that moves for focusing is also described as a lens unit Lfo. The arrows shown in each lens cross sectional view represent moving directions of lens units upon focusing from infinity to close object distance. The lens unit Lfo and the lens unit Lfl travel in different loci to each other for focusing, to thereby suppress variation of curvature of field during focusing.

Aberration diagrams of the zoom lens of Embodiments 1 to 8 with focusing on an object at infinity are shown in FIGS. 2A, 4A, 6A, 8A, 10A, 12A, 14A and 16A for the shortest focal length, FIGS. 2B, 4B, 6B, 8B, 10B, 12B, 14B and 16B for the intermediate focal length, and FIGS. 2C, 4C, 6C, 8C, 10C, 12C, 14C and 16C for the longest focal length.

In spherical aberration diagrams, Fno indicates F-number, and indicates spherical aberration amount are drawn with respect to d-line (wavelength 587.6 nm) and g-line (wavelength 435.8 nm). In astigmatism diagrams, ΔS represents sagittal image plane and ΔM represents meridional image plane. Distortion diagrams at the shortest and intermediate focal length are drawn for d-line with a reference of equisolid angle projection method, and distortion diagrams at the longest focal length are drawn for d-line with a reference of central projection method. Chromatic aberration diagrams are drawn for g-line. ω represents half angle of view (°) based on paraxial theory.

When a fisheye lens is attached to an image pickup apparatus having an image pickup element, an object image that is substantially circular is formed whereas securing an angle of view of approximately 180° in any direction (this method is called 'circular fisheye type'). Additionally, there is a fisheye type in which the entire angle of view of approximately 180° is secured in the diagonal direction of the image pickup element (called as 'full-frame fisheye type'). It should be noted that, in the present disclosure, the shortest focal length among focal lengths in which the full-frame fisheye is obtained is defined as the intermediate focal length.

The fisheye lens generally adopts a projection type satisfying the following equation, where Y is image height, f is focal length and ω is half angle of view.

$$Y = 2f \times \tan(\omega/2) \quad \text{Stereographic projection}$$
$$Y = f\omega \quad \text{Equidistance projection}$$
$$Y = 2f \times \sin(\omega/2) \quad \text{Equisolid angle projection}$$
$$Y = f \times \sin(\omega) \quad \text{Orthographic projection}$$

In addition, the following projection type is generally used for lenses other than fisheye lenses.

$$Y = f \times \tan(\omega) \quad \text{Perspective projection}$$

In zoom lenses according to the present disclosure, a design is made on the assumption of the equisolid angle projection at the shortest focal length.

Figure 17:
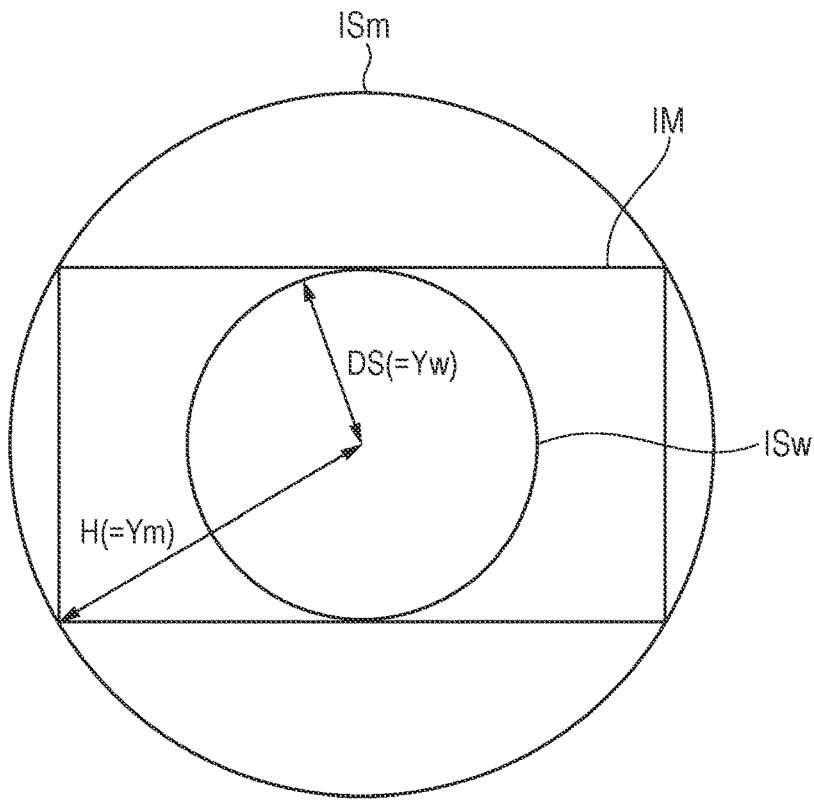
FIG. 17 is a schematic diagram of an image circle and an image pickup element of a zoom lens of the present disclosure.

FIG. 17 is a schematic diagram of an image circle formed in a zoom lens according to the aspect of the embodiments and an image pickup surface of the image pickup element used in the image pickup apparatus. In FIG. 17, IM represents a rectangular image pickup element in which a diagonal length of the image pickup surface is 2×H.

In FIG. 17, ISw represents an image circle at the shortest focal length, and the maximum image height Yw substantially matches the radius of the image circle ISw. Also, the maximum image height Yw is almost the same as half DS of short side length of the rectangular image pickup element IM. ISm is an image circle at the intermediate focal length, and the maximum image height Ym at the intermediate focal length is roughly equal to H, which is half the length of diagonal length of the image pickup element IM.

Figure 18:
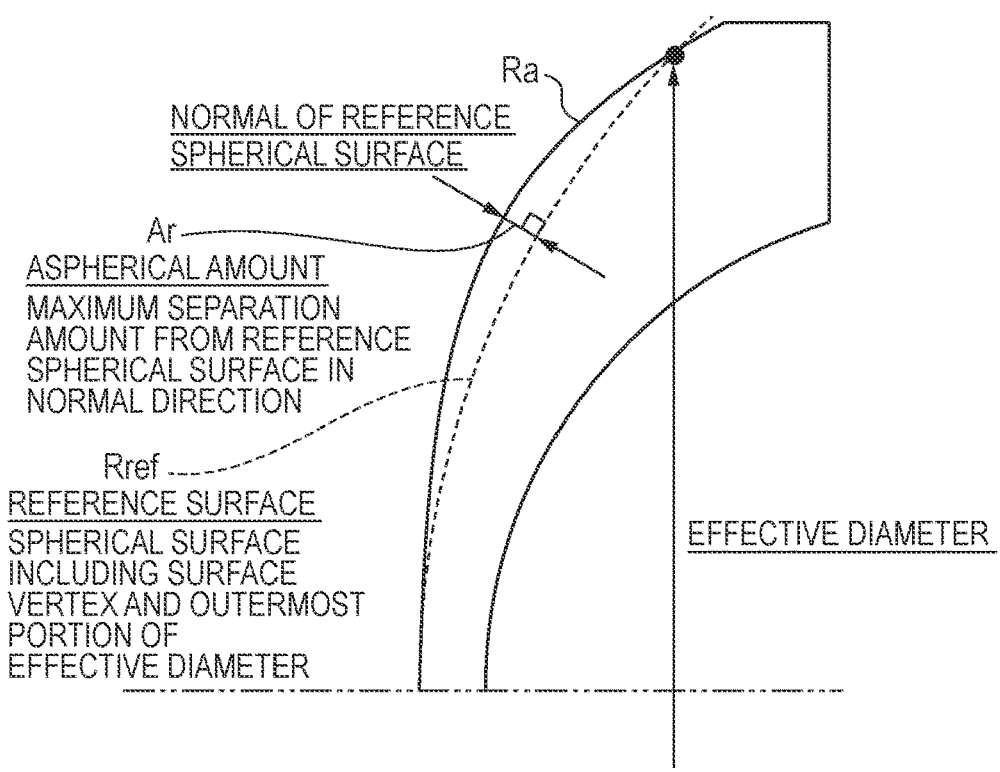
FIG. 18 is an illustration of an aspherical surface shape.

Next, the definition of an aspherical surface formed on a lens surface according to the present disclosure will be described. An aspherical surface amount Ar represents, as shown in FIG. 18, a maximum value of difference amount between a reference spherical surface Rref and the aspherical surface Ra. The radius of the reference spherical surface Rref (radius of curvature) is a radius of a sphere defined by a surface vertex and an effective beam diameter. The sign of the aspherical amount is defined as positive when the direction of the deviation of the aspherical surface Ra from the reference spherical surface Rref is a direction which thickens the medium with respect to the reference spherical surface Rref, and direction, and the sign of the aspherical amount is defined as negative when the direction of the deviation of the aspherical surface Ra from the reference spherical surface Rref is a direction which makes thinner the medium with respect to the reference spherical surface Rref. For example, an aspherical surface Ra shown in FIG. 18 has a positive aspherical amount. That is, an aspherical surface having an aspherical amount according to the present disclosure satisfies the following inequalities (xa) and (xb), $$0.0003 < Ar/Ea \times Nd \quad \text{(xa)}$$
$$-0.0003 > Ar/Ea \times Nd \quad \text{(xb)}$$

where Ar represents an aspherical amount, Ea represents an effective ray diameter of an aspherical surface, and Nd represents a refractive index of material of an aspherical lens.

An aspherical surface deviating from the inequalities (xa) and (xb) has small aspherical effect so that the effect of the aspect of embodiments is not sufficiently obtained, and therefore is not included in the aspherical surface according to the disclosure.

Hereinafter, a zoom lens of each embodiment will be described in detail.

The zoom lens of Embodiment 1 is a five-unit zoom lens includes, in order from the object side to the image side: a first lens unit L1 having a negative refractive power; a second lens unit L2 having a negative refractive power; a third lens unit L3 having a positive refractive power; a fourth lens unit L4 having a negative refractive power; and a fifth lens unit L5 having a positive refractive power.

During zooming from the wide angle end to the telephoto end, the first lens unit L1 and the second lens unit L2 move along loci concave to the object side, the third lens unit L3 moves to the object side linearly, and the fourth lens unit L4 and the fifth lens unit L5 move to the object side along locus convex to the object side. For focusing, the second lens unit L2 (Lfo) and the fourth lens unit L4 (Lfl) move along loci different from each other.

The zoom lens of Embodiment 2 is a five-unit zoom lens includes, in order from the object side to the image side: a first lens unit L1 having a negative refractive power; a second lens unit L2 having a positive refractive power, a third lens unit L3 having a positive refractive power; a fourth lens unit L4 having a positive refractive power, and a fifth lens unit L5 having a negative refractive power.

During zooming from the wide angle end to the telephoto end, the first lens unit L1 moves along a locus concave to the object side, the third lens unit L3 moves to the object side linearly, the second lens unit L2 and the fourth lens unit L4 move to the object side, and the fifth lens unit L5 moves to the object side along a locus convex to the object side. For focusing, the second lens unit L2 (Lfo) and the fourth lens unit L4 (Lfl) move along loci different from each other.

The zoom lens of Embodiment 3 is a five-unit zoom lens includes, in order from the object side to the image side: a first lens unit L1 having a negative of refractive power; a second zoom lens L2 having a positive refractive power; a third lens unit L3 having a positive refractive power; a fourth lens unit L4 having a positive refractive power, and a fifth lens unit L5 having a positive refractive power.

During zooming from the wide angle end to the telephoto end, the first lens unit L1 moves along a locus concave to the object side, the third lens unit L3 moves to the object side linearly, the second lens unit L2 and the fourth lens unit L4 move to the object side, and the fifth lens unit L5 moves to the object side along a locus convex to the object side. The second lens unit L2 moves for focusing.

The zoom lens of Embodiment 4 is a six-unit zoom lens includes in order from the object side to the image side; a first lens unit L1 having a negative refractive power; a second lens unit L2 having a positive refractive power; a third lens unit L3 having a positive refractive power; a fourth lens unit L4 having a positive refractive power; a fifth lens unit L5 having a positive refractive power; and a sixth lens unit L6 having a positive refractive power.

During zooming from the wide angle end to the telephoto end, the first lens unit L1 moves along a locus concave to the object side, the third lens unit L3 moves to the object side linearly, the second lens unit L2 and the fourth lens unit L4 move to the object side, and the fifth lens unit L5 and the sixth lens unit L6 move along the respective loci concave to the object side. The second lens unit L2 moves for focusing.

The zoom lens of Embodiment 5 is a five-unit zoom lens includes in order from the object side to the image side: a first lens unit L1 having a negative refractive power; a second lens unit L2 having a positive refractive power; a third lens unit L3 having a positive refractive power; a fourth lens unit L4 having a positive refractive power; and a fifth lens unit L5 having a positive refractive power.

During zooming from the wide angle end to the telephoto end, the first lens unit L1 moves to the image side, the third lens unit L3 moves to the object side linearly, the second lens unit L2, the fourth lens unit L4 and the fifth lens unit L5 move to the object side. The second lens unit L2 moves for focusing.

The zoom lens of Embodiment 6 is a three-unit zoom lens includes, in order from the object side to the image side: a first lens unit L1 having a negative refractive power; a second lens unit L2 having a positive refractive power; and a third lens unit L3 having a positive refractive power.

During zooming from the wide angle end to the telephoto end, the first lens unit L1 moves along a locus concave to the object side; the second lens unit L2 moves to the object side linearly; and the third lens unit L3 moves to the image side. A part of the second lens unit L2 moves for focusing.

The zoom lens of Embodiment 7 is a five-unit zoom lens includes, in order from the object side to the image side; a first lens unit L1 having a negative refractive power; a second lens unit L2 having a positive refractive power; a third lens unit L3 having a positive refractive power; a fourth lens unit L4 having a positive refractive power; and a fifth lens unit L5 having a positive refractive power.

During zooming from the wide angle end to the telephoto end, the first lens unit L1 moves along a locus concave to the object side, the third lens unit L3 moves to the object side linearly, the second lens unit L2 and the fourth lens unit L4 move to the object side, the fifth lens unit L5 moves along a locus concave to the object side. The second lens unit L2 moves for focusing.

The zoom lens of Embodiment 8 is a five-unit zoom lens includes, in order from the object side to the image side: a first lens unit L1 having a negative refractive power; a second lens unit L2 having a positive refractive power; a third lens unit L3 having a positive refractive power; a fourth lens unit L4 having a positive refractive power; and a fifth lens unit L5 having a positive refractive power.

During zooming from the wide angle end to the telephoto end, the first lens unit L1 moves to the image side, the third lens unit L3 moves to the object side linearly, and the second lens unit L2, the fourth lens unit L4 and the fifth lens unit L5 move to the object side. The second lens unit L2 moves for focusing.

Next, the characteristic configuration of each embodiment of the zoom lens will be described.

The zoom lens of the present disclosure includes in order from the object side to the image side, the first lens unit having a negative refractive power, and a rear lens group including one or more lens units, in which an interval of adjacent lens units changes during zooming (varying magnification). Positions of the first lens unit and the one or more lens units can be set to a first zoom position (a first zoom state), a second zoom position (a second zoom state) and a third zoom position (a third zoom state). A first image height exists at the first zoom position, and a second image height exists at the second zoom position. Angles of view at the first image height and the second image height are 160° or larger, respectively. At the third zoom position, distortion at a first image height is −30% or more.

The following inequalities are satisfied, $$1.5 < H1/H2 < 3.0 \quad (1)$$

$$5.0 < Lw/fw < 22.5$$

where H1 represents the first image height, H2 represents the second image height, Lw represents a distance from a lens surface closest to an object to an image plane at the shortest focal length (wide angle end), and fw represents the focal length of the whole of the zoom lens at the shortest focal length.

The inequality (1) specifies the distance Lw from the lens surface closest to the object to the image plane at the shortest focal length by the focal length fw of the entire lens system at the shortest focal length. If Lw is smaller so that the inequality (1) is not satisfied at the lower limit, the focal length of each lens unit becomes too small so that various off-axial aberrations increase and the optical performance cannot be obtained, which is not preferable. Alternatively, if fw is larger so that the inequality (1) is not satisfied at the lower limit, it is not preferable because a sufficient angle of view cannot be obtained at the shortest focal length.

If Lw is larger so that the upper limit of the inequality (1) is not satisfied, the total length becomes long, which is undesirable. Alternatively, if fw is becomes smaller so that the upper limit of the inequality (1) is not satisfied, it becomes difficult to obtain a high optical performance because a focal length of each lens unit becomes so strong that various off-axial aberrations such as chromatic aberration of magnification increase.

Further, the numerical value range of the inequality (1) is set to the range of the following inequality (1a).

$$8 < Lw/fw < 20 \quad (1a)$$

Further, the numerical value range of the inequality (1) is range of the following inequality (1b).

$$12 < Lw/fw < 19 \quad (1b)$$

Next, a description will be given to a condition that is satisfied by the zoom lens of each embodiment. The zoom lens of each embodiment satisfies one or more of the following inequalities (2) to (7).

$$-2.1 < f1/fw < -0.5 \quad (2)$$
$$-0.8 < f1/ft < 0.0 \quad (3)$$
$$1.0 < (R1a+R1b)/(R1a-R1b) < 4.5 \quad (4)$$
$$0.31 < skw/skt < 1.20 \quad (5)$$
$$1.5 < ft/fw < 4.0 \quad (6)$$
$$1.6 < G1Nd < 2.5 \quad (7)$$

Next, the technical meanings of the above-mentioned inequalities will be described.

The inequality (2) defines a ratio of focal length f1 of the first lens unit L1 to the focal length fw of the entire optical system at the shortest focal length. If f1 is smaller so that the lower limit of the inequality (2) is not satisfied, the refractive power of the first lens unit L1 becomes so strong that various off-axial aberrations such as chromatic aberration of magnification increase, and it becomes difficult to obtain a high optical performance. If f1 is larger so that the upper limit of the inequality (2) is not satisfied, the amount of movement for zooming of the first lens unit L1 is increased in order to obtain a high zoom ratio, which is undesirable because the total length of the optical system increases.

The inequality (3) specifies a ratio of the focal length f1 of the first lens unit L1 to the focal length ft of the total optical system at the longest focal length. If f1 is smaller so that the lower limit of the inequality (3) is not satisfied, the refractive power of the first lens unit is so large that various off-axial aberrations such as chromatic aberration of magnification increases, and it becomes difficult to obtain a high optical performance. If f1 is larger so that the upper limit of the inequality (3) is not satisfied, the amount of movement of the first lens unit L1 is increased in order to obtain a high zoom ratio, which is undesirable because the total length of the optical system is increased.

The inequality (4) defines the lens shape (shape factor) of the first lens unit where R1a represents a radius of curvature of the object-side surface of the first negative lens of meniscus shape included in the first negative lens L1 and R1b represents a radius of curvature of the image-side surface of the first negative lens. If the lower limit of the inequality (4) is not satisfied, the refractive power of the first negative lens is so strong that it becomes difficult to get a high optical performance. If the upper limit of the inequality (4) is not satisfied, the refractive power of the first negative lens is too weak to gain a wide angle of view.

The inequality (5) defines a ratio of back focus skw at the shortest focal length to back focus skt at the longest focal length. If skw is so small that the lower limit of the inequality (5) is not satisfied, the distance between the lens and the camera becomes so small that the degree of freedom of the mechanical layout is reduced, which is not preferable. Alternatively, if skt is large that the lower limit of the inequality (5) is not satisfied, the total lens length becomes larger, which is undesirable. If skw is large that the upper limit of the inequality (5) is not satisfied, the total lens length becomes larger, which is undesirable. Alternatively, if skt is small that the upper limit of the inequality (5) is not satisfied, the distance between the lens and the camera becomes so small that the degree of freedom of the mechanical layout is reduced, which is undesirable.

The inequality (6) specifies a ratio of the focal length ft of the entire system at the longest focal length to the focal length fw of the entire system at the shortest focal length. If fw is small so that the upper limit of the inequality (6) is not satisfied, it becomes difficult to obtain a high optical performance because the focal length of each lens unit becomes so strong that various off-axial aberrations increase. Alternatively, if ft is large so that the upper limit of the inequality (6) is not satisfied, it is not preferable because an image pickup area of wide angle of view becomes narrower. If fw is large so that the lower limit of the inequality (6) is not satisfied, it is not preferable because a sufficient angle of view cannot be obtained at the shortest focal length. Alternatively, if ft is small so that the lower limit of the inequality (6) is not satisfied, the focal length of each lens unit becomes so strong that various off-axial aberrations such as distortion at the longest focal length, which is not preferable.

The inequality (7) defines a refractive index of glass material of the first lens G1 disposed closest to the object in the first lens unit L1. The inequality (7) is provided to mainly reduce the generation of curvature of field, and correction of curvature of field is easily carried out as long as satisfying the inequality (7).

In one embodiment, the zoom lens includes a lens unit disposed in the image side of the first lens unit L1, in which the lens unit includes an aspherical lens having a negative aspherical surface amount, or the lens unit has a refractive power. A distance D between an image pickup surface to a vertex on the optical axis of a lens disposed closest to the image plane in a lens unit disposed closest to the image plane among these lens units at the longest focal length satisfies the following inequality (8).

$$0.00 < D/H1 < 2.28 \quad (8)$$

If D becomes smaller so that the lower limit of the inequality (8) is not satisfied, the distance between the lens having a negative optical effect in the longest focal length and the camera becomes so close that the degree of freedom of the mechanical layout decreases. If D becomes larger so that the upper limit of the inequality (8) is not satisfied, the distance between the lens having a negative optical effect in the longest focal length and image pickup surface becomes so large that correction of distortion becomes difficult.

In addition, if the aforementioned zoom lens has a lens unit including an aspherical lens having a negative aspherical amount in lens units disposed in the image side of the first lens unit, the following inequality is satisfied, $$-0.1000 < Ar1/Ea1 \times Nd1 < -0.0003 \quad (9)$$

where Ar1 represents an aspherical amount of an aspherical surface (surface As) having the largest negative aspherical amount of an aspherical lens having a negative aspherical amount disposed closest to the image plane, Eal represents an effective beam diameter, and Ndl represents a refractive index of material of the aspherical lens. If the lower limit of the inequality (9) is not satisfied, rate of change of aspherical surface inclination angle is so large that the molding the aspherical surface is difficult. If the upper limit of the inequality (9) is not satisfied, the obtained aspherical surface effect becomes small, which is not preferable.

The zoom lens L0 of any one of Embodiments 1-8 is designed to allow a generation of barrel distortion at the longest focal length. Assuming the use of the electronic aberration correction technology thanks to recent technological developments, this image processing technology can correct the distortion of the image caused by distortion. Thus, a storage device (memory device) attached to these zoom lens L0 has information relating to the design value of distortion amount of the zoom lens L0, and the electronic image which has been picked up by using the image pickup optical system can be correct by image processing in any image processor attached to the zoom lens L0 (e.g., a CPU attached to the image pickup apparatus such as camera body) by use of design value of the distortion amount.

For this reason, it is that the lens apparatus sends the signal of correction of the barrel distortion at the longest focal length to the image processor. In addition, in the shortest focal length, more ideal equisolid angle projection can be obtained by the image processing.

Furthermore, in one embodiment, the following inequality is satisfied in the case of image processing, $$|Clw/Clt| < 1 \quad (10)$$

where Clw represents a maximum distortion correction amount in a case of elimination of distortion in equisolid angle projection at the shortest focal length, and Clt represents a maximum distortion correction amount in a case of elimination of distortion in perspective projection at the longest focal length.

The inequality (10) defines a ratio of the maximum distortion correction amount Clw at the shortest focal length to the maximum distortion correction amount Clt at the longest focal length. If Clw becomes larger so that the upper limit of the inequality (10) is not satisfied, the image quality at the shortest focal length deteriorates, which is undesirable. Alternatively, if Clt becomes smaller so that the upper limit of the inequality (10) is not satisfied, the electronic distortion correction cannot be sufficiently performed at the longest focal length, so that the amount of distortion is too large to adopt the zoom lens as a wide angle lens, which is undesirable.

In one embodiment, the lens apparatus is mounted to and used in an image pickup apparatus having an image pickup element that receives an image formed by the lens apparatus. The image-pickup area of the image pickup element is of rectangle. A maximum image height is lower than half any side of the image-pickup area at a focal length of the zoom lens, and a maximum image height is more than half a diagonal length of the image-pickup area at a focal length. The zoom lens has a zoom range from a focal length at which the maximum image height is less than half the short side of the rectangle image-pickup area and to a focal length at which the maximum image height is more than half the diagonal length of the rectangle image-pickup area. The following inequalities are satisfied, $$80° < \omega w < 110° \quad (11)$$

$$1.4 < H/Yw < 2.6 \quad (12)$$

$$-30\% < Vt < 30\% \quad (13)$$

$$-2.8 < H/fl < -0.5 \quad (14)$$

where ωw represents a half angle of view at the shortest focal length at which an image height is defined by a half of the diagonal length of the rectangle image-pickup area, H represents a length of a half of the diagonal length of the image pickup element, Yw represents the maximum image height at the shortest focal length, Vt represents a distortion amount at the maximum image height at the longest focal length, and f1 represents the focal length of the first lens unit.

The inequality (11) defines a half angle of view at the shortest focal length. The fisheye lens enables an image pickup at a wide angle of view by allowing distortion, and mainly has an angle of view of more than 80°. If the lower limit of the inequality (11) is not satisfied, it is undesirable that angle of view is narrow and image pickup in a desired condition will cannot be possible. If the upper limit of the inequality (11) is not satisfied, the angle of view becomes large so that the refractive power of the first lens unit becomes too strong and it becomes difficult to get a high optical performance.

The inequality (12) defines half the length H of the diagonal length of the rectangle image pickup element IM and the maximum image height Yw at the shortest focal length. There are a variety of aspect ratios, (long side length):(short side length), of the image pickup element IM, such as 4:3 and 16:9. In Embodiments 1 to 8, the aspect ratio, (long side length):(short side length), of the image pickup element IM is 4:3. If Yw becomes larger so that the lower limit of the inequality (12) is not satisfied, Yw exceeds the short side SS of the rectangle image pickup element IM, and the substantially circular object image cannot not be obtained, which is undesirable. If Yw becomes smaller so that the upper limit of the inequality (12) is not satisfied, the portion where the object image is not formed in the peripheral portion in the image-pickup area becomes large, which is undesirable.

The inequality (13) defines the distortion amount at the maximum image height in the longest focal length.

If Vt becomes smaller so that the lower limit of the inequality (13), the distortion amount of the peripheral portion becomes too large to be used as a wide angle lens, which is undesirable. If Vt becomes larger so that the upper limit of the inequality (13) is not satisfied, the distortion amount of the peripheral portion becomes too large to be used as a wide angle lens, which is undesirable.

The inequality (14) defines half the length H of the diagonal length of the rectangle image pickup element IM and the focal length f1 of the first lens unit. If f1 becomes smaller so that the lower limit of the inequality (14) is not satisfied, the refractive power of the first lens unit becomes strong so that various off-axial aberrations such as chromatic aberration of magnification increases, and it becomes difficult to obtain a high optical performance. When f1 becomes larger so that the upper limit of the inequality (14) is not satisfied, the negative refractive power is small in the first lens unit so that a sufficient angle of view cannot be secured in the shortest focal length, which is not preferable.

In addition, the image pickup apparatus having the zoom lens of the aspect of the embodiments satisfies the inequality (15), $$0.00 < D/H < 2.28 \quad (15)$$

where H represents half the length of the diagonal length of the rectangle image pickup element IM.

The inequality (15) defines a ratio of a distance D between an image pickup surface and a lens unit disposed closest to the image plane among lens units including an aspherical lens having a negative aspherical amount and lens units having a negative refractive power to the largest image height Yt at the longest focal length, that is, the length H of half the diagonal length of the rectangle image pickup element IM. If D is small so that the lower limit of the inequality (15) is not satisfied, the distance between the lens with a negative optical effect at the longest focal length and the camera becomes too close so that the degree of freedom of the mechanical layout decreases. If D is large so that the upper limit of the inequality (15) is not satisfied, the distance between the lens having a negative optical effect and the image pickup surface at the longest focal length becomes long so that the correction of distortion becomes difficult.

In one embodiment, the numerical ranges of the inequalities (2) to (15) be the following inequalities (2a) to (15a).

$$-2.1 < f1/fw < -0.5 \quad (2a)$$

$$-0.72 < f1/ft < 0.00 \quad (3a)$$

$$1.2 < (R1a + R1b)/(R1a - R1b) < 4.0 \quad (4a)$$

$$0.35 < skw/skt < 1.00 \quad (5a)$$

$$1.8 < ft/fw < 3.7 \quad (6a)$$

$$1.72 < G1Nd < 2.30 \quad (7a)$$

$$0.00 < D/H1 < 2.28 \quad (8a)$$

$$-0.0800 < Ar1/Ea1 \times Nd1 < -0.0008 \quad (9a)$$

$$0.0 \le |C1w/C1t| < 0.7 \quad (10a)$$

$$82° < \omega w < 105° \quad (11a)$$

$$1.4 < H/Yw < 2.6 \quad (12a)$$

$$-25\% < Vt < 25\% \quad (13a)$$

$$-1.8 < H/f1 < -0.6 \quad (14a)$$

$$0.5 < D/H < 2.0 \quad (15a)$$

Further, in one embodiment, the numerical ranges of the inequalities (2) to (15) are the following inequalities (2b) to (15b).

$$-2.1 < f1/fw < -0.5 \quad (2b)$$

$$-0.6 < f1/ft < 0.0 \quad (3b)$$

$$1.5 < (R1a + R1b)/(R1a - R1b) < 2.5 \quad (4b)$$

$$0.60 < skw/skt < 0.98 \quad (5b)$$

-continued $$2.0 < ft/fw < 3.5 \quad (6b)$$

$$1.9 < G1Nd < 2.2 \quad (7b)$$

$$0.8 < D/H1 < 1.8 \quad (8b)$$

$$-0.050 < Ar1/Ea1 \times Nd1 < -0.001 \quad (9b)$$

$$0.0 \le |C1w/C1t| < 0.5 \quad (10b)$$

$$85° < \omega w < 100° \quad (11b)$$

$$1.4 < H/Yw < 2.6 \quad (12b)$$

$$-20\% < Vt < 20\% \quad (13b)$$

$$-1.7 < H/f1 < -0.7 \quad (14b)$$

$$0.8 < D/H < 1.8 \quad (15b)$$

In Embodiments 1 to 8, in order to obtain a zoom lens having a wide angle of view and a high optical performance, the first lens unit L1 includes in order from the object side to the image side, a negative lens, a negative lens, a positive lens, a negative lens and a positive lens. By including negative lenses more that positive lenses in the first lens unit L1, the change of beam height of the off-axial beam is moderated, and astigmatism can be favorably corrected by further including positive lens to arrangement.

Also, in order to reduce distortion at the longest focal length and obtain images with less distortion, in one embodiment, the lens unit is disposed closest to the image plane is a lens unit including an aspherical lens having a negative aspherical amount or a lens unit having a negative refractive power. The image pickup surface and the lens unit having a negative refractive power are disposed to each other, to thereby correct distortion at the longest focal length.

Note that in the shortest focal length in each embodiment, the optical system is designed on the assumption of equisolid angle projection represented by the following formula.

$$Y = 2f \times \sin(\omega/2)$$

However, other projection type peculiar to fisheye lenses as described above or still other projection type may be used.

As described above, according to the aspect of the embodiments, a zoom lens with a small size of the entire optical system and a high optical performance is obtained with a half angle of view of 80° or more at the shortest focal length, with which picking up an image with less distortion with wide angle of view at the longest focal length can be obtained.

Hereinafter, Embodiments 1 to 8 corresponding respectively Numerical Embodiments 1 to 8 are shown.

In surface data of each Numerical Embodiment, r represents a radius of curvature of each optical surface, and d (mm) represents on-axis interval (distance on the optical axis) between the m-th surface and the (m+1)-th surface. m is the number of surface counted from the light-incident side. In addition, nd denotes a refractive index for d-line of each optical member, and vd denotes Abbe number of optical member. It should be noted that a certain Abbe number vd of material is represented by, $$vd=(Nd-1)/(NF-NC)$$

where Nd, NF and NC represent a refractive index for d-line (587.6 nm), F-line (486.1 nm) and C-line (656.3 nm) of the Fraunhofer line, respectively.

Note that in each Numerical Embodiment, d, focal length (mm), F-number, and half angle of view (°) are values obtained in a case where the zoom lens of each Embodiment focuses on an object at infinity. Back focus BF is a distance from a final lens surface to the image plane. Total lens length is a sum of the distance from the first lens surface to the final lens surface and back focus.

In the case where optical surface is an aspherical surface, * sign is indicated to the right of the surface number. An aspherical surface shape is expressed by the following formula, $$x = (h^2/R) / \left[ 1 + \{1 - (1+k)(h/R)^2\}^{1/2} \right] + A4 \times h^4 + A6 \times h^6 + A8 \times h^8 + A10 \times h^{10} + A12 \times h^{12}$$

where X is displacement amount from a surface vertex in the optical axis direction, h represents the height from the optical axis in a direction perpendicular to the optical axis, R represents a paraxial radius of curvature, k represents a conic constant, A4, A6, A8, A10, and A12 are aspherical surface coefficients of each order. e±XX in the aspheric surface coefficients means $\times 10^{\pm XX}$.

Embodiment 1

Unit mm
Surface data

| Surface number | r | d | nd | vd | Effective diameter |
|---|---|---|---|---|---|
| 1 | 68.891 | 2.70 | 1.75500 | 52.3 | 62.43 |
| 2 | 16.252 | 13.16 | | | 32.33 |
| 3* | −31.358 | 1.80 | 1.85400 | 40.4 | 31.21 |
| 4* | −295.709 | 7.22 | | | 27.91 |
| 5 | −73.813 | 1.60 | 1.71999 | 50.2 | 27.71 |
| 6 | 107.450 | 0.20 | | | 27.78 |
| 7 | 31.028 | 6.60 | 1.85883 | 30.0 | 28.39 |
| 8 | −92.576 | 1.40 | 1.55332 | 71.7 | 27.65 |
| 9 | 44.284 | (Variable) | | | 25.54 |
| 10 | 23.175 | 3.90 | 1.58313 | 59.4 | 14.86 |
| 11 | −25.709 | 0.80 | 1.69100 | 54.8 | 13.98 |
| 12 | 27.211 | (Variable) | | | 14.05 |
| 13 | 38.274 | 2.90 | 1.78800 | 47.4 | 14.18 |
| 14 | −22.489 | 0.80 | 1.71736 | 29.5 | 14.26 |
| 15 | −290.445 | 0.20 | | | 14.34 |
| 16 | 18.736 | 2.04 | 1.49700 | 81.5 | 14.42 |
| 17 | 127.109 | 3.68 | | | 14.22 |
| 18 (Stop) | ∞ | 2.02 | | | 13.14 |
| 19 | −576.349 | 1.50 | 1.69680 | 55.5 | 12.52 |
| 20 | 19.855 | 0.92 | | | 12.10 |
| 21 | 68.264 | 1.52 | 1.88300 | 40.8 | 12.13 |
| 22 | −72.288 | 0.19 | | | 12.13 |
| 23 | 23.248 | 3.77 | 1.48749 | 70.2 | 11.94 |
| 24 | −14.512 | 1.00 | 1.88300 | 40.8 | 12.51 |
| 25 | 57.926 | 1.24 | | | 13.98 |
| 26 | 54.769 | 2.84 | 1.59522 | 67.7 | 16.09 |
| 27 | −28.633 | (Variable) | | | 16.73 |
| 28* | −23.977 | 1.20 | 1.58313 | 59.4 | 24.85 |
| 29 | −49.364 | (Variable) | | | 27.46 |
| 30* | 31.365 | 5.47 | 1.55332 | 71.7 | 28.88 |
| 31* | −39.338 | (Variable) | | | 30.48 |
| Image plane | ∞ | | | | |

Aspherical surface data

Third surface

K = 0.00000e+000 A2 = 3.91548e−002 A4 = −1.1525e−004 A6 = 3.65395e−007
A8 = −3.36626e−010 A10 = −3.45437e−013

Fourth surface

K = 0.00000e +000 A2 = 3.85729e−002 A4 = −1.25597e−004 A6 = 4.60400e−007
A8 = −6.08889e−010 A10 = 2.45724e−012 Al2 = −9.48594e−015

Twenty-eighth surface

K = 0.00000e +000 A2 = −1.31706e−002 A4 = 9.31218e−005 A6 = −4.47912e−007
A8 = 2.32387e−009 A10 = −5.66587e−012 A12 = 3.97325e−015

Thirtieth surface

K = 0.00000e+000 A2 = −9.66503e−003 A4 = −5.30360e−005 A6 = 1.64954e−007
A8 = −8.89006e−010 A10 = 9.44150e−013

Embodiment 1

Thirty-first surface

K = 0.00000e+000 A2 = −8.02162e−003 A4 = 4.70798e−005 A6 = −2.25802e−007
A8 = 7.67147e−010 A10 = −3.05280e−012 A12 = 4.61152e−015

Various data
zoom ratio 2.95

|  | Wide angle end | Intermediate | Telephoto end |
|---|---|---|---|
| Focal length | 8.13 | 14.00 | 24.00 |
| F-number | 4.12 | 4.12 | 4.15 |
| Half angle of view | 88.31 | 87.50 | 47.24 |
| Image height | 11.15 | 21.64 | 21.64 |
| Total lens length | 123.86 | 114.76 | 116.93 |
| BF | 13.97 | 15.24 | 15.22 |
| d9 | 25.64 | 14.97 | 1.96 |
| d12 | 8.95 | 0.56 | 0.56 |
| d27 | 2.32 | 10.29 | 25.98 |
| d29 | 2.31 | 3.01 | 2.54 |
| d31 | 13.97 | 15.24 | 15.22 |

Zoom lens unit Data

| Unit | Leading surface | Focal length | Lens structure length | Front principal point position | Rear principal point position |
|---|---|---|---|---|---|
| 1 | 1 | −15.71 | 34.69 | 6.79 | −18.67 |
| 2 | 10 | −427.36 | 4.70 | 36.32 | 30.76 |
| 3 | 13 | 22.85 | 24.63 | 4.55 | −17.30 |
| 4 | 28 | −36.35 | 1.20 | −0.32 | −1.09 |
| 5 | 30 | 34.10 | 5.47 | 2.75 | −0.83 |

Embodiment 2

Unit mm
Surface data

| Surface number | r | d | nd | vd | Effective diameter |
|---|---|---|---|---|---|
| 1 | 68.066 | 2.70 | 1.76811 | 49.9 | 68.60 |
| 2 | 35.416 | 11.58 |  |  | 52.25 |
| 3 | 389.943 | 1.75 | 1.58425 | 69.1 | 48.22 |
| 4 | 17.721 | 11.45 |  |  | 31.50 |
| 5 | −107.685 | 1.60 | 1.54748 | 73.9 | 30.92 |
| 6 | 29.245 | 5.49 |  |  | 28.53 |
| 7 | 32.841 | 2.84 | 1.91826 | 24.5 | 28.61 |
| 8 | 57.767 | (Variable) |  |  | 28.04 |
| 9* | 39.587 | 3.84 | 1.58313 | 59.4 | 16.23 |
| 10 | −25.498 | 0.72 |  |  | 15.35 |
| 11 | −23.025 | 0.98 | 1.77764 | 49.0 | 14.41 |
| 12 | −49.203 | (Variable) |  |  | 14.71 |
| 13 | −141.956 | 1.70 | 1.80888 | 35.9 | 14.86 |
| 14 | −57.206 | 0.09 |  |  | 15.00 |
| 15 | 32.149 | 3.99 | 1.52217 | 77.5 | 14.95 |
| 16 | −33.521 | 0.17 |  |  | 14.53 |
| 17 (Stop) | ∞ | 1.27 |  |  | 14.01 |
| 18 | −84.089 | 1.50 | 1.86122 | 39.2 | 13.47 |
| 19 | 25.216 | 1.02 |  |  | 12.93 |
| 20 | 189.489 | 0.96 | 1.71839 | 29.1 | 12.96 |
| 21 | 32.893 | 0.07 |  |  | 12.98 |
| 22 | 33.910 | 3.25 | 1.60119 | 67.4 | 12.99 |
| 23 | −31.659 | (Variable) |  |  | 13.09 |
| 24 | 124.769 | 5.90 | 1.64744 | 50.2 | 19.16 |
| 25 | −18.299 | 1.00 | 1.88318 | 40.8 | 20.07 |
| 26 | −45.025 | (Variable) |  |  | 21.33 |
| 27 | 568.266 | 0.97 | 1.71290 | 53.3 | 26.29 |
| 28 | 33.943 | 2.99 |  |  | 27.15 |
| 29 | 43.003 | 6.23 | 1.49705 | 81.6 | 31.89 |
| 30 | −154.751 | (Variable) |  |  | 32.93 |
| Image plane | ∞ |  |  |  |  |

-continued

Embodiment 2

Aspherical surface data

Ninth field

K = 0.00000e+000 A4 = −2.22410e−005 A6 = −2.48822e−008 A8 = −7.54458e−011
A10 = 3.77919e−012 A12 = −3.86308e−014

Various data
Zoom ratio 2.86

|  | Wide angle end | Intermediate | Telephoto end |
|---|---|---|---|
| Focal length | 8.41 | 15.30 | 24.01 |
| F-number | 4.12 | 4.12 | 4.12 |
| Half angle of view | 88.18 | 87.39 | 49.50 |
| Image height | 11.15 | 21.64 | 21.64 |
| Total lens length | 133.43 | 120.78 | 124.90 |
| BF | 14.46 | 19.93 | 17.02 |
| d8 | 38.51 | 13.97 | 3.12 |
| d12 | 3.22 | 2.55 | 1.20 |
| d23 | 1.99 | 8.01 | 19.84 |
| d26 | 1.18 | 2.27 | 9.65 |
| d30 | 14.46 | 19.93 | 17.02 |

Zoom lens unit Data

| Unit | Leading surface | Focal length | Lens structure length | Front principal point position | Rear principal point position |
|---|---|---|---|---|---|
| 1 | 1 | −16.86 | 37.41 | 12.66 | −19.86 |
| 2 | 9 | 50.28 | 5.54 | 0.44 | −3.27 |
| 3 | 13 | 58.54 | 14.01 | 1.62 | −8.54 |
| 4 | 24 | 84.22 | 6.90 | 2.95 | −1.23 |
| 5 | 27 | −249.93 | 10.19 | −13.54 | −22.38 |

Embodiment 3

Unit mm
Surface data

| Surface number | r | d | nd | vd | Effective diameter |
|---|---|---|---|---|---|
| 1 | 97.221 | 2.50 | 2.00100 | 29.1 | 55.35 |
| 2 | 19.141 | 14.18 |  |  | 35.24 |
| 3 | −103.708 | 1.80 | 1.99469 | 29.5 | 34.57 |
| 4 | 40.929 | 1.61 |  |  | 33.69 |
| 5 | 36.566 | 13.38 | 1.81603 | 25.3 | 35.63 |
| 6 | −37.306 | 1.17 |  |  | 34.96 |
| 7 | −31.839 | 1.40 | 1.53723 | 75.3 | 32.71 |
| 8 | 37.482 | 0.20 |  |  | 29.91 |
| 9 | 27.405 | 1.97 | 1.88592 | 22.7 | 29.89 |
| 10 | 34.208 | (Variable) |  |  | 29.38 |
| 11 | 24.648 | 7.95 | 1.72245 | 38.5 | 26.18 |
| 12 | −42.504 | 8.64 | 1.84730 | 23.8 | 24.57 |
| 13 | 18.139 | 1.59 |  |  | 17.32 |
| 14 | 23.971 | 6.99 | 1.99863 | 28.2 | 17.15 |
| 15 | −79.895 | 2.81 | 1.60234 | 52.3 | 14.82 |
| 16 | 30.516 | (Variable) |  |  | 14.48 |
| 17(Stop) | ∞ | 0.20 |  |  | 15.42 |
| 18 | 26.702 | 4.73 | 1.49684 | 81.6 | 15.77 |
| 19 | −17.506 | 1.00 | 1.74329 | 49.0 | 15.69 |
| 20 | −59.849 | 1.01 |  |  | 15.93 |
| 21 | 24.515 | 5.56 | 1.49691 | 81.6 | 15.88 |
| 22 | −23.647 | 1.09 | 1.59740 | 56.6 | 15.68 |
| 23 | 22.897 | (Variable) |  |  | 16.66 |
| 24 | 52.530 | 5.78 | 1.49692 | 81.6 | 18.67 |
| 25 | −16.935 | 1.48 |  |  | 19.60 |
| 26 | −16.582 | 1.20 | 1.77538 | 46.2 | 19.72 |
| 27 | −26.924 | 0.10 |  |  | 21.22 |
| 28 | 170.564 | 2.18 | 1.49699 | 81.5 | 22.58 |
| 29 | −242.516 | 1.00 |  |  | 23.02 |
| 30 | −134.613 | 2.00 | 1.60000 | 55.0 | 23.32 |

-continued

Embodiment 3

| | | | | | |
|---|---|---|---|---|---|
| 31 | 287.552 | (Variable) | | | 24.16 |
| 32* | 25.506 | 4.09 | 1.58313 | 59.4 | 35.38 |
| 33 | −57.987 | (Variable) | | | 36.28 |
| Image plane | ∞ | | | | |

Aspherical surface data

Thirty-second field

K = 0.00000e+000 A2 = −1.73275e−002 A4 = −2.04113e−005 A6 = −3.38575e−009
A8 = −1.92821e−011 A10 = −2.78026e−015

Various data
Zoom ratio 2.84

| | Wide angle end | Intermediate | Telephoto end |
|---|---|---|---|
| Focal length | 8.44 | 14.82 | 24.00 |
| F-number | 4.12 | 4.12 | 4.15 |
| Half angle of view | 87.50 | 87.50 | 46.25 |
| Image height | 11.15 | 21.64 | 21.64 |
| Total lens length | 162.00 | 153.46 | 162.75 |
| BF | 13.50 | 16.57 | 13.52 |
| d10 | 37.62 | 8.92 | 1.00 |
| d16 | 5.77 | 8.93 | 4.66 |
| d23 | 5.88 | 2.62 | 1.35 |
| d31 | 1.63 | 18.81 | 44.61 |
| d33 | 13.50 | 16.57 | 13.52 |

Zoom lens unit Data

| Unit | Leading surface | Focal length | Lens structure length | Front principal point position | Rear principal point position |
|---|---|---|---|---|---|
| 1 | 1 | −15.84 | 38.21 | 5.03 | −20.01 |
| 2 | 11 | 68.56 | 27.98 | −14.92 | −25.88 |
| 3 | 17 | 81.11 | 13.58 | −13.10 | −18.94 |
| 4 | 24 | 48.86 | 13.73 | 0.89 | −8.80 |
| 5 | 32 | 79.10 | 4.09 | 2.06 | −0.54 |

Embodiment 4

Unit mm
Surface data

| Surface number | r | d | nd | vd | Effective diameter |
|---|---|---|---|---|---|
| 1 | 60.086 | 2.50 | 2.00100 | 29.1 | 58.00 |
| 2 | 18.346 | 15.93 | | | 35.22 |
| 3 | −90.288 | 1.80 | 1.95523 | 32.0 | 33.82 |
| 4 | 48.533 | 1.90 | | | 31.82 |
| 5 | 33.425 | 8.44 | 1.80979 | 25.2 | 31.85 |
| 6 | −60.948 | 1.66 | | | 30.71 |
| 7 | −36.167 | 1.40 | 1.50887 | 79.6 | 30.07 |
| 8 | 23.876 | 0.20 | | | 26.10 |
| 9 | 22.554 | 2.20 | 1.89286 | 20.4 | 26.06 |
| 10 | 29.658 | (Variable) | | | 25.45 |
| 11 | 18.800 | 5.14 | 1.91892 | 34.8 | 16.93 |
| 12 | −30.140 | 0.80 | 1.91223 | 24.5 | 15.35 |
| 13 | 15.411 | 0.85 | | | 12.93 |
| 14 | 23.640 | 2.00 | 2.00070 | 25.5 | 12.75 |
| 15 | −273.689 | 1.01 | 1.61748 | 54.3 | 12.14 |
| 16 | 24.551 | (Variable) | | | 12.07 |
| 17(Stop) | ∞ | 0.20 | | | 13.45 |
| 18 | 24.172 | 4.45 | 1.49699 | 81.6 | 13.76 |
| 19 | −14.119 | 1.00 | 1.98666 | 30.0 | 13.70 |
| 20 | −1034.141 | 2.15 | | | 14.37 |
| 21 | 77.459 | 2.45 | 1.89840 | 24.3 | 15.60 |
| 22 | −26.901 | 0.20 | | | 15.73 |
| 23 | 31.972 | 4.52 | 1.49700 | 81.6 | 16.75 |
| 24 | −21.523 | 1.00 | 1.71597 | 37.0 | 16.88 |
| 25 | 32.554 | (Variable) | | | 17.58 |

-continued

Embodiment 4

| | | | | | |
|---|---|---|---|---|---|
| 26 | 72.470 | 5.91 | 1.49700 | 81.6 | 20.74 |
| 27 | −18.282 | 2.51 | | | 21.42 |
| 28 | −16.179 | 1.20 | 1.80212 | 39.4 | 21.22 |
| 29 | −31.272 | (Variable) | | | 23.18 |
| 30* | 58.138 | 2.50 | 1.58313 | 59.4 | 30.41 |
| 31 | −33.285 | (Variable) | | | 32.01 |
| 32 | −255.425 | 1.50 | 1.87281 | 38.8 | 34.76 |
| 33 | −129.647 | (Variable) | | | 35.14 |
| Image plane | ∞ | | | | |

Aspherical surface data

Thirtieth field

K = 0.00000e+000 A2 = −1.82032e-002 A4 = −2.30583e-005 A6 =1.01076e-008
A8 = −9.21698e-011 A10 = 5.35598e-014

Various data
Zoom ratio 3.00

| | Wide angle end | Intermediate | Telephoto end |
|---|---|---|---|
| Focal length | 8.00 | 14.03 | 24.00 |
| F-number | 4.12 | 4.12 | 4.15 |
| Half angle of view | 87.50 | 87.50 | 45.45 |
| Image height | 11.15 | 21.64 | 21.64 |
| Total lens length | 132.04 | 126.91 | 135.41 |
| BF | 13.50 | 13.50 | 14.54 |
| d10 | 32.81 | 12.32 | 1.00 |
| d16 | 4.90 | 6.62 | 6.21 |
| d25 | 4.70 | 4.44 | 1.15 |
| d29 | 0.20 | 14.10 | 35.56 |
| d31 | 0.50 | 0.50 | 1.52 |
| d33 | 13.50 | 13.50 | 14.54 |

Zoom lens unit Data

| Unit | Leading surface | Focal length | Lens structure length | Front principal point position | Rear principal point position |
|---|---|---|---|---|---|
| 1 | 1 | −14.67 | 36.03 | 7.44 | −15.60 |
| 2 | 11 | 62.44 | 9.79 | −9.13 | −12.97 |
| 3 | 17 | 46.30 | 15.97 | 0.74 | −9.44 |
| 4 | 26 | 81.89 | 9.62 | −1.66 | −8.47 |
| 5 | 30 | 150.84 | 2.50 | 4.17 | 2.67 |
| 6 | 32 | 299.98 | 1.50 | 1.62 | 0.82 |

Embodiment 5

Unit mm
Surface data

| Surface number | r | d | nd | vd | Effective diameter |
|---|---|---|---|---|---|
| 1 | 73.817 | 2.50 | 2.00100 | 29.1 | 58.00 |
| 2 | 19.350 | 16.18 | | | 36.22 |
| 3 | −63.316 | 1.80 | 2.00107 | 29.1 | 35.00 |
| 4 | 84.477 | 0.19 | | | 34.14 |
| 5 | 54.287 | 8.66 | 1.81851 | 24.9 | 34.30 |
| 6 | −42.087 | 1.21 | | | 33.76 |
| 7 | −32.944 | 1.40 | 1.49697 | 81.6 | 33.40 |
| 8 | 36.431 | 0.20 | | | 30.41 |
| 9 | 33.666 | 2.40 | 1.89286 | 20.4 | 30.39 |
| 10 | 52.473 | (Variable) | | | 29.92 |
| 11 | 16.051 | 2.71 | 1.71697 | 51.6 | 16.56 |
| 12 | 24.673 | 0.80 | 2.00073 | 25.5 | 15.28 |
| 13 | 14.808 | 0.93 | | | 14.20 |
| 14 | 22.439 | 2.88 | 1.90266 | 32.9 | 14.38 |
| 15 | −41.685 | 1.00 | 1.69170 | 37.3 | 14.34 |
| 16 | 25.023 | (Variable) | | | 14.11 |
| 17 (Stop) | ∞ | 0.20 | | | 15.37 |
| 18 | 25.455 | 5.05 | 1.49696 | 81.7 | 15.75 |

-continued

Embodiment 5

| | | | | |
|---|---|---|---|---|
| 19 | −15.894 | 1.00 | 1.91935 | 34.6 | 15.67 |
| 20 | 70.281 | 0.20 | | | 16.42 |
| 21 | 43.896 | 2.45 | 1.99304 | 25.4 | 16.77 |
| 22 | −44.948 | 0.20 | | | 16.86 |
| 23 | 59.501 | 3.01 | 1.49706 | 81.6 | 16.61 |
| 24 | −29.195 | 1.00 | 1.77474 | 32.5 | 16.36 |
| 25 | 96.007 | (Variable) | | | 16.22 |
| 26 | 51.768 | 4.70 | 1.59678 | 67.6 | 21.11 |
| 27 | −26.086 | 6.27 | | | 21.43 |
| 28 | −16.955 | 1.20 | 1.93162 | 33.8 | 20.69 |
| 29 | −33.742 | (Variable) | | | 22.45 |
| 30* | 26.873 | 2.50 | 1.58313 | 59.4 | 28.06 |
| 31 | −210.742 | (Variable) | | | 29.43 |
| Image plane | ∞ | | | | |

Aspherical surface data

Thirtieth field

K = 0.00000e+000 A2 = −1.65940e−002 A4 = −2.57641e−005 A6 = −9.23106e−009
A8 = −1.24314e−010 A10 = 9.47308e−014

Various data
Zoom ratio 3.34

| | Wide angle end | Intermediate | Telephoto end |
|---|---|---|---|
| Focal length | 8.39 | 14.42 | 28.00 |
| F-number | 4.12 | 4.12 | 4.15 |
| Half angle of view | 87.50 | 87.52 | 41.26 |
| Image height | 11.15 | 21.64 | 21.64 |
| Total lens length | 143.29 | 127.48 | 127.37 |
| BF | 13.50 | 16.77 | 34.49 |
| d10 | 42.79 | 17.46 | 1.00 |
| d16 | 7.84 | 7.57 | 5.75 |
| d25 | 8.33 | 6.36 | 0.20 |
| d29 | 0.20 | 8.69 | 15.30 |
| d31 | 13.50 | 16.77 | 34.49 |

Zoom lens unit Data

| Unit | Leading surface | Focal length | Lens structure length | Front principal point position | Rear principal point position |
|---|---|---|---|---|---|
| 1 | 1 | −17.42 | 34.54 | 5.58 | −18.15 |
| 2 | 11 | 84.96 | 8.31 | −9.49 | −13.11 |
| 3 | 17 | 58.66 | 13.10 | −0.61 | −8.63 |
| 4 | 26 | 76.25 | 12.16 | −11.33 | −18.28 |
| 5 | 30 | 195.94 | 2.50 | 0.86 | −0.73 |

Embodiment 6

Unit mm
Surface data

| Surface number | r | d | nd | vd | Effective diameter |
|---|---|---|---|---|---|
| 1 | 56.152 | 2.50 | 2.00100 | 29.1 | 58.00 |
| 2 | 17.740 | 16.46 | | | 34.49 |
| 3 | −80.185 | 1.80 | 1.85146 | 40.8 | 33.10 |
| 4 | 47.785 | 1.27 | | | 30.99 |
| 5 | 28.164 | 8.09 | 1.80673 | 25.4 | 30.78 |
| 6 | −98.099 | 1.85 | | | 29.37 |
| 7 | −39.529 | 1.40 | 1.54326 | 74.4 | 29.01 |
| 8 | 22.892 | 0.20 | | | 25.17 |
| 9 | 20.538 | 1.97 | 1.89286 | 20.4 | 25.12 |
| 10 | 25.157 | (Variable) | | | 24.50 |
| 11 | 19.074 | 6.55 | 1.93576 | 33.4 | 17.02 |
| 12 | −31.133 | 0.80 | 1.98504 | 25.3 | 14.34 |
| 13 | 16.098 | 0.81 | | | 12.36 |
| 14 | 26.052 | 2.00 | 2.00081 | 26.7 | 12.20 |
| 15 | −437.637 | 3.76 | 1.51435 | 53.8 | 11.94 |

Embodiment 6

| | | | | | |
|---|---|---|---|---|---|
| 16 | 33.668 | 3.97 | | | 12.19 |
| 17(Stop) | ∞ | 0.20 | | | 13.14 |
| 18 | 23.551 | 4.13 | 1.49700 | 81.6 | 13.48 |
| 19 | −15.129 | 1.00 | 2.00094 | 28.3 | 13.45 |
| 20 | −225.111 | 3.98 | | | 14.02 |
| 21 | 177.430 | 2.28 | 1.84666 | 23.8 | 17.11 |
| 22 | −30.476 | 0.20 | | | 17.56 |
| 23 | 31.666 | 5.04 | 1.49700 | 81.6 | 19.16 |
| 24 | −26.300 | 1.00 | 1.60843 | 42.6 | 19.38 |
| 25 | 28.540 | 1.00 | | | 20.17 |
| 26 | 41.088 | 6.71 | 1.49699 | 81.6 | 20.57 |
| 27 | −18.011 | 1.20 | | | 21.22 |
| 28 | −16.909 | 1.20 | 1.73756 | 49.5 | 21.02 |
| 29 | −39.941 | (Variable) | | | 22.71 |
| 30* | 37.851 | 2.50 | 1.58313 | 59.4 | 30.96 |
| 31 | −51.054 | (Variable) | | | 32.44 |
| Image plane | ∞ | | | | |

Aspherical surface data

Thirtieth field

K = 0.00000e+000 A2 = −1.72545e−002 A4 = −2.57001e−005 A6 = 1.11190e−008
A8 = −7.76257e−011 A10 = 5.66353e−014

Various data
Zoom ratio 3.00

| | Wide angle end | Intermediate | Telephoto end |
|---|---|---|---|
| Focal length | 8.00 | 14.07 | 24.00 |
| F-number | 4.12 | 4.12 | 4.15 |
| Half angle of view | 87.50 | 87.50 | 45.29 |
| Image height | 11.15 | 21.64 | 21.64 |
| Total lens length | 130.81 | 126.55 | 139.75 |
| BF | 13.91 | 13.50 | 13.50 |
| d10 | 29.80 | 11.21 | 1.00 |
| d29 | 3.22 | 17.95 | 41.37 |
| d31 | 13.91 | 13.50 | 13.50 |

Zoom lens unit Data

| Unit | Leading surface | Focal length | Lens structure length | Front principal point position | Rear principal point position |
|---|---|---|---|---|---|
| 1 | 1 | −13.25 | 35.55 | 8.45 | −13.21 |
| 2 | 11 | 28.61 | 45.83 | 15.61 | −27.63 |
| 3 | 30 | 147.29 | 2.50 | 2.66 | 1.10 |

Embodiment 7

Unit mm
Surface data

| Surface number | r | d | nd | vd | Effective diameter |
|---|---|---|---|---|---|
| 1 | 52.159 | 2.50 | 2.00101 | 29.1 | 43.52 |
| 2 | 14.228 | 11.13 | | | 26.83 |
| 3 | −140.977 | 1.80 | 2.00091 | 27.9 | 25.93 |
| 4 | 31.950 | 0.19 | | | 24.46 |
| 5 | 23.651 | 6.84 | 1.98504 | 25.3 | 24.73 |
| 6 | −71.666 | 1.37 | | | 23.58 |
| 7 | −32.436 | 1.40 | 1.60479 | 66.1 | 23.23 |
| 8 | 19.120 | 0.20 | | | 20.33 |
| 9 | 18.594 | 2.35 | 1.89286 | 20.4 | 20.34 |
| 10 | 28.787 | (Variable) | | | 19.72 |
| 11 | 15.238 | 4.92 | 1.92540 | 34.2 | 14.82 |
| 12 | −19.878 | 0.80 | 1.93647 | 24.7 | 13.38 |
| 13 | 12.023 | 0.80 | | | 10.89 |
| 14 | 18.056 | 2.00 | 2.00071 | 25.5 | 11.15 |
| 15 | −70.981 | 1.24 | 1.55661 | 45.8 | 11.14 |
| 16 | 19.572 | (Variable) | | | 11.00 |

-continued

Embodiment 7

| | | | | | |
|---|---|---|---|---|---|
| 17(Stop) | ∞ | 0.20 | | | 11.59 |
| 18 | 17.301 | 4.97 | 1.49705 | 81.6 | 11.88 |
| 19 | −10.521 | 1.00 | 1.95575 | 24.9 | 11.69 |
| 20 | −54.004 | 1.00 | | | 12.27 |
| 21 | 485.066 | 2.78 | 1.84666 | 23.8 | 12.96 |
| 22 | −14.951 | 0.20 | | | 13.59 |
| 23 | −17.348 | 1.00 | 1.80582 | 37.2 | 13.68 |
| 24 | 74.533 | 1.96 | 1.49700 | 81.6 | 15.04 |
| 25 | −50.508 | (Variable) | | | 15.67 |
| 26 | 65.613 | 4.33 | 1.49700 | 81.6 | 18.09 |
| 27 | −19.760 | 4.94 | | | 18.67 |
| 28 | −13.346 | 1.20 | 1.79913 | 44.4 | 19.06 |
| 29 | −20.937 | (Variable) | | | 21.11 |
| 30* | −99.594 | 2.50 | 1.58313 | 59.4 | 28.49 |
| 31 | −22.223 | (Variable) | | | 30.02 |
| Image plane | ∞ | | | | |

Aspherical surface data

Thirtieth field

K = 0.00000e+000 A2 = −8.33890e−003 A4 = −4.56413e−005 A6 = 2.26227e−008
A8 = −1.58239e−010 A10 = −1.64075e−013

Various data
Zoom ratio 2.79

| | Wide angle end | Intermediate | Telephoto end |
|---|---|---|---|
| Focal length | 8.60 | 14.84 | 24.00 |
| F-number | 4.12 | 4.12 | 4.15 |
| Half angle of view | 80.50 | 80.50 | 44.45 |
| Image height | 11.15 | 21.64 | 21.64 |
| Total lens length | 100.03 | 101.73 | 111.69 |
| BF | 12.37 | 11.95 | 12.91 |
| d10 | 19.62 | 7.42 | 1.00 |
| d16 | 3.09 | 4.04 | 3.30 |
| d25 | 1.12 | 1.67 | 0.20 |
| d29 | 0.20 | 13.04 | 30.67 |
| d31 | 12.37 | 11.95 | 12.91 |

Zoom lens unit Data

| Unit | Leading surface | Focal length | Lens structure length | Front principal point position | Rear principal point position |
|---|---|---|---|---|---|
| 1 | 1 | −12.61 | 27.78 | 5.69 | −10.98 |
| 2 | 11 | 38.84 | 9.76 | −5.68 | −9.97 |
| 3 | 17 | 46.69 | 13.11 | 2.47 | −6.70 |
| 4 | 26 | 67.46 | 10.48 | −3.68 | −11.45 |
| 5 | 30 | 88.45 | 2.50 | 3.67 | 2.18 |

Embodiment 8
Unit mm
Surface data

| Surface number | r | d | nd | vd | Effective diameter |
|---|---|---|---|---|---|
| 1 | 69.380 | 2.50 | 2.00100 | 29.1 | 53.40 |
| 2 | 17.817 | 14.96 | | | 33.23 |
| 3 | −54.823 | 1.80 | 2.00102 | 29.1 | 31.99 |
| 4 | 69.899 | 0.93 | | | 31.27 |
| 5 | 55.090 | 8.18 | 1.82494 | 24.6 | 31.60 |
| 6 | −36.254 | 1.10 | | | 31.24 |
| 7 | −29.119 | 1.40 | 1.50346 | 80.5 | 30.91 |
| 8 | 44.993 | 0.20 | | | 28.86 |
| 9 | 33.606 | 2.12 | 1.89286 | 20.4 | 28.81 |
| 10 | 50.362 | (Variable) | | | 28.39 |
| 11 | 15.547 | 3.95 | 1.69839 | 53.5 | 16.26 |
| 12 | 29.187 | 0.80 | 1.97602 | 25.2 | 15.53 |
| 13 | 14.132 | 1.02 | | | 14.95 |

-continued

Embodiment 8

| | | | | | |
|---|---|---|---|---|---|
| 14 | 20.941 | 2.53 | 1.98390 | 30.2 | 15.16 |
| 15 | −159.273 | 1.00 | 1.60928 | 39.1 | 15.09 |
| 16 | 21.748 | (Variable) | | | 14.81 |
| 17(Stop) | ∞ | 0.20 | | | 16.40 |
| 18 | 24.308 | 5.58 | 1.49699 | 81.6 | 16.85 |
| 19 | −16.733 | 1.00 | 1.95312 | 32.2 | 16.71 |
| 20 | 67.340 | 0.20 | | | 17.51 |
| 21 | 37.841 | 3.06 | 1.84665 | 23.8 | 18.01 |
| 22 | −41.844 | 0.20 | | | 18.13 |
| 23 | 43.936 | 3.52 | 1.49701 | 81.6 | 17.82 |
| 24 | −31.532 | 1.00 | 1.84883 | 34.6 | 17.49 |
| 25 | 83.522 | (Variable) | | | 17.28 |
| 26 | 41.427 | 4.85 | 1.56501 | 71.5 | 20.86 |
| 27 | −27.002 | 6.43 | | | 21.15 |
| 28 | −17.250 | 1.20 | 1.86892 | 39.1 | 20.38 |
| 29 | −45.703 | (Variable) | | | 22.18 |
| 30* | 28.332 | 2.50 | 1.58313 | 59.4 | 27.68 |
| 31 | −44.408 | (Variable) | | | 28.61 |
| Image plane | ∞ | | | | |

Aspherical surface data

Thirtieth field

K = 0.00000e+000 A2 = −1.95525e−002 A4 = −2.47904e−005 A6 = −1.68825e−008
A8 = −6.79421e−011 A10 +32 −6.48202e−014

Various data
Zoom ratio 3.32

| | Wide angle end | Intermediate | Telephoto end |
|---|---|---|---|
| Focal length | 8.43 | 14.71 | 28.00 |
| F-number | 4.12 | 4.12 | 4.15 |
| Half angle of view | 87.50 | 87.67 | 43.25 |
| Image height | 11.15 | 21.64 | 21.64 |
| Total lens length | 145.00 | 131.05 | 136.47 |
| BF | 13.50 | 19.97 | 47.55 |
| d10 | 43.04 | 18.68 | 1.00 |
| d16 | 7.49 | 6.63 | 7.28 |
| d25 | 8.55 | 4.93 | 0.20 |
| d29 | 0.20 | 8.61 | 8.23 |
| d31 | 13.50 | 19.97 | 47.55 |

Zoom lens unit Data

| Unit | Leading surface | Focal length | Lens structure length | Front principal point position | Rear principal point position |
|---|---|---|---|---|---|
| 1 | 1 | −16.14 | 33.19 | 4.86 | −18.75 |
| 2 | 11 | 73.36 | 9.30 | −9.65 | −13.62 |
| 3 | 17 | 70.47 | 14.75 | −3.12 | −11.77 |
| 4 | 26 | 95.40 | 12.48 | −19.46 | −24.47 |
| 5 | 30 | 91.28 | 2.50 | 1.90 | 0.32 |

The various values for each numerical embodiment are summarized in Table 1 below.

TABLE 1

| Conditional Expression | | Numerical Embodiment | | | | | | | |
|---|---|---|---|---|---|---|---|---|---|
| | | 1 | 2 | 3 | 4 | 5 | 6 | 7 | 8 |
| (1) | Lw/fw | 15.229 | 15.883 | 19.185 | 16.505 | 17.085 | 16.350 | 11.631 | 17.194 |
| (2) | f1/fw | −1.933 | −2.007 | −1.875 | −1.834 | −2.077 | −1.656 | −1.465 | −1.909 |
| (3) | f1/ft | −0.655 | −0.703 | −0.660 | −0.611 | −0.622 | −0.552 | −0.525 | −0.575 |
| (4) | (R1a + R1b)/(R1a−R1b) | 1.617 | 3.169 | 1.490 | 1.879 | 1.711 | 1.924 | 1.750 | 1.691 |
| (5) | skw/skt | 0.918 | 0.849 | 1.000 | 0.928 | 0.391 | 1.030 | 0.959 | 0.284 |
| (6) | ft/fw | 2.952 | 2.857 | 2.842 | 3.000 | 3.338 | 3.000 | 2.791 | 3.320 |
| (7) | G1Nd | 1.755 | 1.768 | 2.001 | 2.001 | 2.001 | 2.001 | 2.001 | 2.001 |
| (8) | D/H1 | 0.951 | 1.064 | 0.845 | 1.098 | 2.156 | 0.844 | 0.759 | 2.972 |
| (9) | Arl/Eal × Ndl | −0.012 | −0.010 | −0.006 | −0.006 | −0.006 | −0.007 | −0.008 | −0.006 |

TABLE 1-continued

| Conditional Expression | | Numerical Embodiment | | | | | | | |
|---|---|---|---|---|---|---|---|---|---|
| | | 1 | 2 | 3 | 4 | 5 | 6 | 7 | 8 |
| (11) | ωw | 88.31 | 88.18 | 87.50 | 87.50 | 87.50 | 87.50 | 80.50 | 87.50 |
| (12) | H/Yw | 1.940 | 1.940 | 1.940 | 1.940 | 1.940 | 1.940 | 1.940 | 1.940 |
| (13) | Vt | −16.642 | −21.822 | −13.691 | −11.238 | −11.917 | −10.777 | −8.060 | −17.872 |
| (14) | H/f1 | −1.376 | −1.283 | −1.367 | −1.475 | −1.242 | −1.633 | −1.717 | −1.344 |
| (15) | D/H | 0.703 | 0.787 | 0.625 | 0.812 | 1.594 | 0.624 | 0.596 | 2.198 |
| | f1 | −15.71 | −16.86 | −15.84 | −14.67 | −17.42 | −13.25 | −12.61 | −16.14 |
| | ft | 24.00 | 24.01 | 24.00 | 24.00 | 28.00 | 24.00 | 24.00 | 28.00 |
| | fw | 8.13 | 8.41 | 8.44 | 8.00 | 8.39 | 8.00 | 8.60 | 8.43 |
| | Lw | 123.86 | 133.43 | 162.00 | 132.04 | 143.29 | 130.81 | 100.03 | 145.00 |
| | skw | 13.97 | 14.46 | 13.50 | 13.50 | 13.50 | 13.91 | 12.37 | 13.50 |
| | skt | 15.22 | 17.02 | 13.52 | 14.54 | 34.49 | 13.50 | 12.91 | 47.55 |
| | G1Nd | 1.7550 | 1.7681 | 2.0010 | 2.0010 | 2.0010 | 2.0010 | 2.0010 | 2.0010 |
| | Yw | 11.15 | 11.15 | 11.15 | 11.15 | 11.15 | 11.15 | 11.15 | 11.15 |
| | R1a | 68.891 | 68.066 | 97.221 | 60.086 | 73.817 | 56.152 | 52.159 | 69.380 |
| | R1b | 16.252 | 35.416 | 19.141 | 18.346 | 19.350 | 17.740 | 14.228 | 17.817 |
| | D | 15.22 | 17.02 | 13.52 | 17.56 | 34.49 | 13.50 | 12.90 | 47.55 |
| | H | 21.64 | 21.64 | 21.64 | 21.64 | 21.64 | 21.64 | 21.64 | 21.64 |
| | H1 | 16 | 16 | 16 | 16 | 16 | 16 | 17 | 16 |
| | H2 | 10.28 | 10.48 | 10.52 | 10.50 | 10.50 | 10.37 | 11.10 | 10.50 |
| | Surface No. of Surface As | 30 | 9 | 32 | 30 | 30 | 30 | 30 | 30 |
| | Arl | −0.528 | −0.257 | −0.335 | −0.289 | −0.267 | −0.343 | −0.376 | −0.255 |
| | Eal | 28.875 | 16.2269 | 35.3771 | 30.4114 | 28.0644 | 30.9592 | 28.4913 | 27.6774 |
| | Ndl | 1.55332 | 1.58313 | 1.58313 | 1.58313 | 1.58313 | 1.58313 | 1.58313 | 1.58313 |

[Image Pickup Apparatus]

Figure 19:
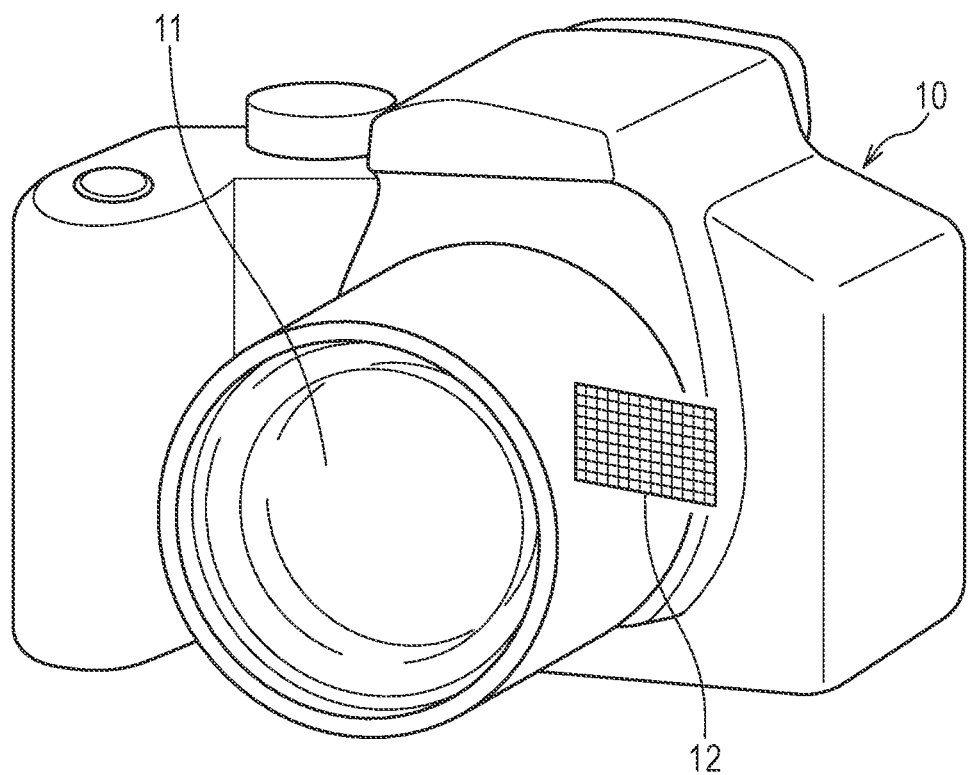
FIG. 19 is a schematic diagram of an image pickup apparatus of the present disclosure.

Next, an embodiment of a digital still camera (image pickup optical system) using a zoom lens of the disclosure as an image pickup optical system will be described with reference to FIG. 19. In FIG. 19, reference numeral 10 denotes a camera body, and 11 denotes an image pickup optical system constituted by a zoom lens according to any one of Embodiments 1 to 8. Reference numeral 12 denotes a solid-state image-pickup element (photoelectric conversion device) such as a CCD sensor and a CMOS sensor built in the camera body and configured to receive light of optical image formed by the image pickup optical system 11 to perform photoelectric conversion. The camera body 10 may be a so-called single-lens reflex camera having a quick turn mirror or a so-called mirrorless camera having no quick turn mirror. Further, the camera body 10 may be detachably equipped with the image pickup optical system 11, or the camera body 10 and the image pickup optical system 11 may be formed integrally.

Thus, by applying the zoom lens of the aspect of the embodiments to an image pickup apparatus such as a digital still camera, an image pickup apparatus having a small lens can be obtained.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-200477, filed Dec. 2, 2020, which is hereby incorporated by reference herein in its entirety.

What is claimed is:

1. A zoom lens comprising in order from an object side to an image side, a first lens unit having a negative refractive power, and a rear lens group including four or more lens units, an interval between adjacent lens units being changed during zooming,
wherein the rear lens group includes a second lens unit, and an aperture stop disposed on the image side of the second lens unit,
wherein the second lens unit is configured to move during focusing,
wherein an angle of view is 160° or larger at a maximum image height and a second image height at a wide angle end and an intermediate focal length,
wherein the following inequalities are satisfied, $$1.5 < H1/H2 < 3.0,$$

$$5.0 < Lw/fw < 22.5, \text{ and}$$

$$-30\% < Vt < 30\%$$

where H1 represents the maximum image height, H2 represents the second image height, Lw represents a distance from a lens surface closest to an object to an image plane at the wide angle end, fw represents a focal length at the wide angle end, and Vt represents a distortion amount at the maximum image height at a telephoto end with a reference of a perspective projection,
wherein the first lens unit includes a first negative lens having a negative refractive power disposed closest to an object, and
wherein the following inequality is satisfied, $$1.9 < G1Nd < 2.5$$

where G1Nd represents a refractive index of a material of the first negative lens.

2. The zoom lens according to claim 1, wherein the following inequality is satisfied, $$-2.1 < f1/fw < -0.5$$

where f1 represents a focal length of the first lens unit.

3. The zoom lens according to claim 1, wherein the following inequality is satisfied, $$-0.8 < f1/ft < 0.0$$

where f1 represents a focal length of the first lens unit and ft represents a focal length of the zoom lens at the telephoto end.

4. The zoom lens according to claim 1,
wherein the first lens unit includes a first negative lens having a negative refractive power disposed closest to an object,
wherein the following inequality is satisfied, $$1.0<(R1a+R1b)/(R1a-R1b)<4.5$$

where R1a and R1b represent curvature radii of an object-side surface and an image side surface of the first negative lens, respectively.

5. The zoom lens according to claim 1, wherein the following inequality is satisfied, $$0.31<skw/skt<1.20$$

where skw represents a back focus at the wide angle end and skt represents a back focus at the telephoto end.

6. The zoom lens according to claim 1, wherein the following inequality is satisfied, $$1.5<ft/fw<4.0$$

where ft represents a focal length of the zoom lens at the telephoto end.

7. The zoom lens according to claim 1,
wherein the rear lens group comprises a lens unit including an aspherical surface having a negative aspherical amount or a lens unit having a negative refractive power, and
wherein the following inequality is satisfied, $$0.00<D/H1<2.28$$

wherein D represents a distance from a lens surface closest to the image plane in the lens unit at telephoto end to the image plane.

8. The zoom lens according to claim 1,
wherein the rear lens group includes an aspherical lens having a negative aspherical amount; and
wherein the following inequality is satisfied, $$-0.1000<Arl/Eal \times Ndl<-0.0003$$

where Arl, Eal and Ndl respectively represent an aspherical amount of a lens surface having a largest negative aspherical amount, an effective diameter, and a refractive index of a material, of an aspherical lens disposed closest the image plane among the aspherical lenses having the negative aspherical amount included in the rear lens group.

9. The zoom lens according to claim 1, wherein the first lens unit comprises in order from an object side to the image side: a negative lens, a negative lens, a positive lens, a negative lens, and a positive lens.

10. The zoom lens according to claim 1,
wherein the lens unit disposed closest to the image plane is a lens unit having a negative refractive power or is a lens unit including at least one aspherical lens having a negative aspherical amount.

11. The zoom lens according to claim 1, comprising a memory device for storing an information regarding a correction amount of a barrel distortion at the telephoto end.

12. The apparatus according to claim 1,
wherein the image pickup element has an image-pickup area of rectangle, wherein the following inequality is satisfied, 80°<ωw<110°
where ωw represents a half angle of view at the wide angle end at which an image height is defined by a half of a diagonal length of the image-pickup area.

13. The apparatus according to claim 1, wherein the following inequality is satisfied, 1.4<H/Yw<2.6
where H represents a half of a diagonal length of the image pickup element and Yw represents a maximum image height at the wide angle end.

14. The apparatus according to claim 1, wherein the following inequality is satisfied, −30%<Vt<30%
where Vt represents a distortion amount at a maximum image height at the telephoto end.

15. The apparatus according to claim 1, wherein the following inequality is satisfied, −2.8<H/f1<−0.5
where H represents a half of a diagonal length of the image pickup element and f1 represents a focal length of the first lens unit.

16. The zoom lens according to claim 1, wherein a peripheral portion of a lens disposed closest to the image plane has a negative refractive power and meniscus shape.

17. The zoom lens according to claim 1, wherein the second lens unit has a positive refractive power.

18. The zoom lens according to claim 17, wherein the rear lens group includes a third lens unit having a positive refractive power and disposed on the image side of the second lens unit.

19. The zoom lens according to claim 18, wherein the third lens unit comprises at least three positive lenses and two negative lenses.

20. The zoom lens according to claim 18, wherein the third lens unit comprises two positive lenses disposed in the object side of the aperture stop and two negative lenses disposed in the image side of the aperture stop.

21. An apparatus comprising:
a zoom lens according to claim 1, and
an image pickup element configured to receive light of an image formed by the zoom lens.

22. The zoom lens according to claim 1,
wherein the rear lens group includes in order from the object side to the image side, the second lens unit, a third lens unit having a positive refractive power, a fourth lens unit and a fifth lens unit, and
wherein the third lens unit includes two or more positive lenses and two or more negative lenses.

23. The zoom lens according to claim 1,
wherein the rear lens group includes in order from the object side to the image side, the second lens unit, a third lens unit having a positive refractive power, a fourth lens unit and a fifth lens unit, and
wherein the third lens unit includes three or more positive lenses and two or more negative lenses.

24. The zoom lens according to claim 1,
wherein the rear lens group includes in order from the object side to the image side, the second lens unit, a third lens unit having a positive refractive power, a fourth lens unit and a fifth lens unit, and
wherein the first lens unit includes two biconcave lenses.

25. The zoom lens according to claim 1,
wherein the rear lens group includes in order from the object side to the image side, the second lens unit, a third lens unit having a positive refractive power, a fourth lens unit and a fifth lens unit, and
wherein the first lens unit includes two biconcave lenses, a negative meniscus lens having a convex surface facing to the object side, and a biconvex lens.

26. The zoom lens according to claim 1,
wherein the first lens unit includes a first negative lens having a negative refractive power disposed closest to an object, and
wherein the following inequality is satisfied, $2.001 \leq G1Nd < 2.5$ where G1Nd represents a refractive index of a material of the first negative lens.

27. The zoom lens according to claim 1, wherein the following inequality is satisfied, $-2.1 < f1/fw \leq -1.656$ where f1 represents a focal length of the first lens unit.

28. The zoom lens according to claim 1, wherein the following inequality is satisfied, $-2.1 < f1/fw \leq -1.834$ where f1 represents a focal length of the first lens unit.

* * * * *